United States Patent
Swartzentruber

(10) Patent No.: US 9,641,466 B2
(45) Date of Patent: May 2, 2017

(54) PACKET STORAGE DISTRIBUTION BASED ON AVAILABLE MEMORY

(71) Applicant: Netronome Systems, Inc., Santa Clara, CA (US)

(72) Inventor: Ron Lamar Swartzentruber, Amesbury, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 95 days.

(21) Appl. No.: 14/507,643

(22) Filed: Oct. 6, 2014

(65) Prior Publication Data

US 2016/0099881 A1    Apr. 7, 2016

(51) Int. Cl.
*H04L 12/861*    (2013.01)

(52) U.S. Cl.
CPC .............................. *H04L 49/9084* (2013.01)

(58) Field of Classification Search
CPC ..... H04B 7/024; H04L 5/0035; H04L 5/0053; H04L 49/9084; H04J 11/0053
See application file for complete search history.

(56) References Cited

U.S. PATENT DOCUMENTS

| | | | |
|---|---|---|---|
| 8,248,945 B1 * | 8/2012 | Sathe | H04L 47/13 370/235 |
| 2006/0056406 A1 * | 3/2006 | Bouchard | H04L 12/56 370/389 |
| 2015/0089165 A1 * | 3/2015 | Stark | G06F 9/3836 711/154 |

\* cited by examiner

*Primary Examiner* — Jianye Wu
(74) *Attorney, Agent, or Firm* — Imperium Patent Works LLP; T. Lester Wallace; Mark D. Marrello

(57) ABSTRACT

A method for receiving a packet descriptor including a priority indicator and a queue number indicating a queue stored within a first memory unit, storing a packet associated with the packet descriptor in a second memory, determining a first amount of free memory in the first memory unit, determining if the first amount of free memory is above a threshold value, writing the packet from the second memory to a third memory when the first amount of memory is above the threshold value and the priority indicator is equal to a first value, not writing the packet from the second memory unit to the third memory unit if the first amount of memory is below the threshold value or when the priority indicator is equal to a second value. The priority indicator is equal to a first value for high priority packets and a second value for low priority packets.

21 Claims, 36 Drawing Sheets

METHOD OF OPERATION OF A RANDOM EARLY DETECTION
PACKET DROPPER WITH DROP PRECEDENCE

MPLS ROUTER

MAC ISLAND
(INGRESS)

TRANSFERRED OVER MINIPACKET BUS

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 7

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| 16-BITS | QUEUE NUMBER: QUEUE TO WHICH THE PACKET BELONGS. ("QUEUE INDICATOR") |
| 8-BITS | I/O DESTINATION TO WHICH THE PACKET IS TO BE SENT. |
| 5-BITS | PACKET SEQUENCER IDENTIFICATION |
| 3-BITS | DROP PRECEDENCE VALUE |
| 1-BITS | PRIORITY INDICATOR (INDICATES IF PACKETS CAN BE DROPPED - OPTIONAL) |

EGRESS PACKET DESCRIPTOR

FIG. 8

ME ISLAND

MU ISLAND

NBI ISLAND
(EGRESS)

RANDOM EARLY DETECTION PACKET DROPPER
WITH DROP PRECEDENCE

7-BIT LINEAR FEEDBACK SHIFT REGISTER

8-BIT LINEAR FEEDBACK SHIFT REGISTER

9-BIT LINEAR FEEDBACK SHIFT REGISTER

QUEUE DEPTH

PACKET DROP PROBABILITY VERSE QUEUE DEPTH RANGE

PACKET DROP PROBABILITY VERSE DROP PRECEDENCE ACROSS A SINGLE QUEUE DEPTH

| RANDOM VALUE | COMPARATOR THRESHOLD | DROP INDICATOR |
|---|---|---|
| 000 | 110 | 0 |
| 001 | 110 | 0 |
| 010 | 110 | 0 |
| 011 | 110 | 0 |
| 100 | 110 | 0 |
| 101 | 110 | 0 |
| 110 | 110 | 0 |
| 111 | 110 | 1 |

QUEUE DEPTH RANGE = 00
OPERATION
(DROP PRECEDENCE = 000)

FIG. 20

| RANDOM VALUE | COMPARATOR THRESHOLD | DROP INDICATOR |
|---|---|---|
| 000 | 100 | 0 |
| 001 | 100 | 0 |
| 010 | 100 | 0 |
| 011 | 100 | 0 |
| 100 | 100 | 0 |
| 101 | 100 | 1 |
| 110 | 100 | 1 |
| 111 | 100 | 1 |

QUEUE DEPTH RANGE = 00
OPERATION
(DROP PRECEDENCE = 001)

FIG. 21

| RANDOM VALUE | COMPARATOR THRESHOLD | DROP INDICATOR |
|---|---|---|
| 000 | 010 | 0 |
| 001 | 010 | 0 |
| 010 | 010 | 0 |
| 011 | 010 | 1 |
| 100 | 010 | 1 |
| 101 | 010 | 1 |
| 110 | 010 | 1 |
| 111 | 010 | 1 |

QUEUE DEPTH RANGE = 00
OPERATION
(DROP PRECEDENCE = 010)

FIG. 22

| RANDOM VALUE | COMPARATOR THRESHOLD | DROP INDICATOR |
|---|---|---|
| 000 | 000 | 0 |
| 001 | 000 | 1 |
| 010 | 000 | 1 |
| 011 | 000 | 1 |
| 100 | 000 | 1 |
| 101 | 000 | 1 |
| 110 | 000 | 1 |
| 111 | 000 | 1 |

QUEUE DEPTH RANGE = 00
OPERATION
(DROP PRECEDENCE = 011)

FIG. 23

RED PACKET DROPPER WITH DROP PRECEDENCE OPERATION

GLOBAL RANDOM EARLY DETECTION PACKET DROPPER

PACKET MOVER CIRCUIT

PACKET MOVER STATE MACHINE DIAGRAM

DROP LOGIC CIRCUIT

DROP LOGIC STATE MACHINE DIAGRAM

GLOBAL RED PACKET DROPPER OPERATION

RANDOM EARLY DETECTION PACKET DROPPER
WITH DROP PRECEDENCE

DROP PROBABILITY REGISTER

| DROP PRECEDENCE | QUEUE DEPTH RANGE | RANDOM VALUE | POINTER |
|---|---|---|---|
| 000 | 00 | 000 | 00000000 |
| 000 | 00 | 001 | 00000001 |
| 000 | 00 | 010 | 00000010 |
| 000 | 00 | 011 | 00000011 |
| 000 | 00 | 100 | 00000100 |
| 000 | 00 | 101 | 00000101 |
| 000 | 00 | 110 | 00000110 |
| 000 | 00 | 111 | 00000111 |
| 000 | 01 | 000 | 00001000 |
| 000 | 01 | 001 | 00001001 |
| 000 | 01 | 010 | 00001010 |
| 000 | 01 | 011 | 00001011 |
| 000 | 01 | 100 | 00001100 |
| 000 | 01 | 101 | 00001101 |
| 000 | 01 | 110 | 00001110 |
| 000 | 01 | 111 | 00001111 |
| 000 | 10 | 000 | 00010000 |
| 000 | 10 | 001 | 00010001 |
| 000 | 10 | 010 | 00010010 |
| 000 | 10 | 011 | 00010011 |
| 000 | 10 | 100 | 00010100 |
| 000 | 10 | 101 | 00010101 |
| 000 | 10 | 110 | 00010110 |
| 000 | 10 | 111 | 00010111 |
| 000 | 11 | 000 | 00011000 |
| 000 | 11 | 001 | 00011001 |
| 000 | 11 | 010 | 00011010 |
| 000 | 11 | 011 | 00011011 |
| 000 | 11 | 100 | 00011100 |
| 000 | 11 | 101 | 00011101 |
| 000 | 11 | 110 | 00011110 |
| 000 | 11 | 111 | 00011111 |

(DROP PRECEDENCE = 000)

POINTER GENERATION

FIG. 33

| DROP PRECEDENCE | QUEUE DEPTH RANGE | RANDOM VALUE | POINTER |
|---|---|---|---|
| 001 | 00 | 000 | 00100000 |
| 001 | 00 | 001 | 00100001 |
| 001 | 00 | 010 | 00100010 |
| 001 | 00 | 011 | 00100011 |
| 001 | 00 | 100 | 00100100 |
| 001 | 00 | 101 | 00100101 |
| 001 | 00 | 110 | 00100110 |
| 001 | 00 | 111 | 00100111 |
| 001 | 01 | 000 | 00101000 |
| 001 | 01 | 001 | 00101001 |
| 001 | 01 | 010 | 00101010 |
| 001 | 01 | 011 | 00101011 |
| 001 | 01 | 100 | 00101100 |
| 001 | 01 | 101 | 00101101 |
| 001 | 01 | 110 | 00101110 |
| 001 | 01 | 111 | 00101111 |
| 001 | 10 | 000 | 00110000 |
| 001 | 10 | 001 | 00110001 |
| 001 | 10 | 010 | 00110010 |
| 001 | 10 | 011 | 00110011 |
| 001 | 10 | 100 | 00110100 |
| 001 | 10 | 101 | 00110101 |
| 001 | 10 | 110 | 00110110 |
| 001 | 10 | 111 | 00110111 |
| 001 | 11 | 000 | 00111000 |
| 001 | 11 | 001 | 00111001 |
| 001 | 11 | 010 | 00111010 |
| 001 | 11 | 011 | 00111011 |
| 001 | 11 | 100 | 00111100 |
| 001 | 11 | 101 | 00111101 |
| 001 | 11 | 110 | 00111110 |
| 001 | 11 | 111 | 00111111 |

(DROP PRECEDENCE = 001)

POINTER GENERATION

FIG. 34

| DROP PRECEDENCE | QUEUE DEPTH RANGE | RANDOM VALUE | POINTER |
|---|---|---|---|
| 010 | 00 | 000 | 01000000 |
| 010 | 00 | 001 | 01000001 |
| 010 | 00 | 010 | 01000010 |
| 010 | 00 | 011 | 01000011 |
| 010 | 00 | 100 | 01000100 |
| 010 | 00 | 101 | 01000101 |
| 010 | 00 | 110 | 01000110 |
| 010 | 00 | 111 | 01000111 |
| 010 | 01 | 000 | 01001000 |
| 010 | 01 | 001 | 01001001 |
| 010 | 01 | 010 | 01001010 |
| 010 | 01 | 011 | 01001011 |
| 010 | 01 | 100 | 01001100 |
| 010 | 01 | 101 | 01001101 |
| 010 | 01 | 110 | 01001110 |
| 010 | 01 | 111 | 01001111 |
| 010 | 10 | 000 | 01010000 |
| 010 | 10 | 001 | 01010001 |
| 010 | 10 | 010 | 01010010 |
| 010 | 10 | 011 | 01010011 |
| 010 | 10 | 100 | 01010100 |
| 010 | 10 | 101 | 01010101 |
| 010 | 10 | 110 | 01010110 |
| 010 | 10 | 111 | 01010111 |
| 010 | 11 | 000 | 01011000 |
| 010 | 11 | 001 | 01011001 |
| 010 | 11 | 010 | 01011010 |
| 010 | 11 | 011 | 01011011 |
| 010 | 11 | 100 | 01011100 |
| 010 | 11 | 101 | 01011101 |
| 010 | 11 | 110 | 01011110 |
| 010 | 11 | 111 | 01011111 |

(DROP PRECEDENCE = 010)

POINTER GENERATION

FIG. 35

| DROP PRECEDENCE | QUEUE DEPTH RANGE | RANDOM VALUE | POINTER |
|---|---|---|---|
| 011 | 00 | 000 | 01100000 |
| 011 | 00 | 001 | 01100001 |
| 011 | 00 | 010 | 01100010 |
| 011 | 00 | 011 | 01100011 |
| 011 | 00 | 100 | 01100100 |
| 011 | 00 | 101 | 01100101 |
| 011 | 00 | 110 | 01100110 |
| 011 | 00 | 111 | 01100111 |
| 011 | 01 | 000 | 01101000 |
| 011 | 01 | 001 | 01101001 |
| 011 | 01 | 010 | 01101010 |
| 011 | 01 | 011 | 01101011 |
| 011 | 01 | 100 | 01101100 |
| 011 | 01 | 101 | 01101101 |
| 011 | 01 | 110 | 01101110 |
| 011 | 01 | 111 | 01101111 |
| 011 | 10 | 000 | 01110000 |
| 011 | 10 | 001 | 01110001 |
| 011 | 10 | 010 | 01110010 |
| 011 | 10 | 011 | 01110011 |
| 011 | 10 | 100 | 01110100 |
| 011 | 10 | 101 | 01110101 |
| 011 | 10 | 110 | 01110110 |
| 011 | 10 | 111 | 01110111 |
| 011 | 11 | 000 | 01111000 |
| 011 | 11 | 001 | 01111001 |
| 011 | 11 | 010 | 01111010 |
| 011 | 11 | 011 | 01111011 |
| 011 | 11 | 100 | 01111100 |
| 011 | 11 | 101 | 01111101 |
| 011 | 11 | 110 | 01111110 |
| 011 | 11 | 111 | 01111111 |

(DROP PRECEDENCE = 011)

POINTER GENERATION

FIG. 36

RED PACKET DROPPER WITH DROP PRECEDENCE OPERATION

METHOD OF OPERATION OF A RANDOM EARLY DETECTION
PACKET DROPPER WITH DROP PRECEDENCE

METHOD OF OPERATION OF A RANDOM EARLY DETECTION
PACKET DROPPER WITH DROP PRECEDENCE

GLOBAL RANDOM EARLY DETECTION PACKET DROPPER

METHOD OF OPERATION OF A GLOBAL RANDOM EARLY
DETECTION PACKET DROPPER

METHOD OF OPERATION OF A GLOBAL RANDOM EARLY
DETECTION PACKET DROPPER

MAC ISLAND
(EGRESS)

PACKET FLOW WHEN LOCAL MEMORY
RESOURCES ARE AVAILABLE

PACKET FLOW WHEN LOCAL MEMORY
RESOURCES ARE SCARCE

PACKET STORAGE DISTRIBUTION BASED ON AVAILABLE MEMORY

TECHNICAL FIELD

The described embodiments relate generally to instantaneous Random Early Detection (RED) packet dropping and efficient storage of packets.

BACKGROUND INFORMATION

In a packet processing system packets are buffered into queues until the queue is full. When the queue is full a subsequently received packet is dropped because no space is available to store the subsequently received packet. If the queue is consistently full, the network will become congested because subsequently received packets will not be transmitted. This phenomenon is referred to as "tail drop" and causes an inefficient distribution of queue space among packets in a flow. Random Early Detection (RED) packet dropping based on average queue depth has been implemented to address this inefficient distribution of queue space among packets in a flow. Improved methods of Random Early Detection (RED) packet dropping may further improve performance of packet processing systems.

SUMMARY

In a first novel aspect, a packet descriptor and a queue number are received. The packet descriptor includes a drop precedence value. The queue number indicates a queue of packet descriptors stored in a memory unit. The drop precedence value is also associated with the queue. The instantaneous queue depth of the indicated queue is determined. In one example, the instantaneous queue depth is determined by reading a queue depth counter associated with the queue. Determining if the packet descriptor is to be dropped based on a drop probability. The drop probability is based on the instantaneous queue depth and drop precedence value. In the event it is determined that the packet descriptor is not to be dropped, the packet descriptor is stored in the queue. In the event it is determined that the packet descriptor is to be dropped, the packet descriptor is not stored in the queue.

In a first example, the queue has a first queue depth range. A first drop probability is used in determining if the packet descriptor is to be dropped when the drop precedence values equal to a first value and the instantaneous queue depth is within the first queue depth range. A second drop probability is used in determining if the packet descriptor is to be dropped when the drop precedence value equals a second value and the instantaneous queue depth is within the second queue depth range.

In a second example, determining if the packet descriptor is to be dropped based on the drop probability includes generating a random value, determining a comparator threshold, and comparing the random value with the comparator threshold to generate a drop indicator. The comparator threshold hold is associated with the drop precedence value and the instantaneous queue depth. The packet descriptor is to be dropped when the drop indicator is a first value, and the packet descriptor is not to be dropped when the drop indicator is a second value.

In a second novel aspect, a state machine receives a packet descriptor and queue number. The queue number indicates a queue in a memory unit that stores packet descriptors. The packet descriptor includes a drop precedence value associated with the queue. The queue has an instantaneous queue depth. A seed is received by a random number generator that outputs a random value. The random value is received by a drop indicator generator that outputs a drop indicator. The drop indicator generator generates the drop indicator based on the drop precedence value and the instantaneous queue depth. The state machine writes the packet descriptor to the queue when the drop indicator is a first value. The state machine does not write the packet descriptor to the queue when the drop indicator is a second value.

In a first example, the drop indicator generator includes a comparator threshold register that stores a plurality of comparator thresholds, a plurality of comparators, and an AND gate. Each comparator receives one bit of the comparator threshold and one bit of the random value and outputs one bit. The AND gate receives the one-bit output from each comparator and outputs a one-bit drop indicator. The comparator threshold is associated with the drop precedence value and the instantaneous queue depth.

In a second example, the drop indicator generator includes a drop probability register that stores a plurality of drop indicators. The state machine combines the drop precedence value, the queue depth range, and the random value to generate a pointer. The pointer points to one drop indicator stored in the drop probability register. The instantaneous queue depth range is within the queue depth range.

In a third novel aspect, a network flow processor includes a memory unit that stores a queue of packet descriptors and a means for randomly dropping a packet descriptor before the packet descriptor is stored in the queue. The packet descriptor includes a drop precedence value. The queue has an instantaneous queue depth. The queue has a first queue depth range. A first drop probability is used to determine if the packet descriptor is to be dropped when the instantaneous queue depth is within the first queue depth range and when the drop precedence value is a first value. A second drop probability is used to determine if the packet descriptor is to be dropped when the instantaneous queue depth is within the first queue depth range and the drop precedence values the second value.

In a first example, the means include a comparator threshold register, a random value generator, a plurality of comparators, and an AND gate.

In a second example, the means include a drop probability register and a random value generator.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table that sets forth the parts of an ingress packet descriptor.

FIG. 8 is a table that sets forth the parts of an egress packet descriptor.

FIG. 20 is a table illustrating the relationship between the random value, the comparator threshold, and the generated drop indicator when operating in queue depth range 00 with a drop precedence value 000.

FIG. 21 is a table illustrating the relationship between the random value, the comparator threshold, and the generated drop indicator when operating in queue depth range 01 with a drop precedence value 001.

FIG. 22 is a table illustrating the relationship between the random value, the comparator threshold, and the generated drop indicator when operating in queue depth range 10 with a drop precedence value 010.

FIG. 23 is a table illustrating the relationship between the random value, the comparator threshold, and the generated drop indicator when operating in queue depth range 11 with a drop precedence value 011.

FIG. 33 is a table illustrating the relationship between drop precedence value, queue depth range, random value and the generated pointer when the drop precedence is a first value.

FIG. 34 is a table illustrating the relationship between drop precedence value, queue depth range, random value and the generated pointer when the drop precedence is a second value.

FIG. 35 is a table illustrating the relationship between drop precedence value, queue depth range, random value and the generated pointer when the drop precedence value is a third value.

FIG. 36 is a table illustrating the relationship between drop precedence value, queue depth range, random value and the generated pointer when the drop precedence is a fourth value.

DETAILED DESCRIPTION

Reference will now be made in detail to background examples and some embodiments of the invention, examples of which are illustrated in the accompanying drawings. In the description and claims below, relational terms such as "horizontal", "vertical", "lateral", "top", "upper", "bottom", "lower", "right", "left", "over" and "under" may be used to describe relative orientations between different parts of a structure being described, and it is to be understood that the overall structure being described can actually be oriented in any way in three-dimensional space.

Figure 1:
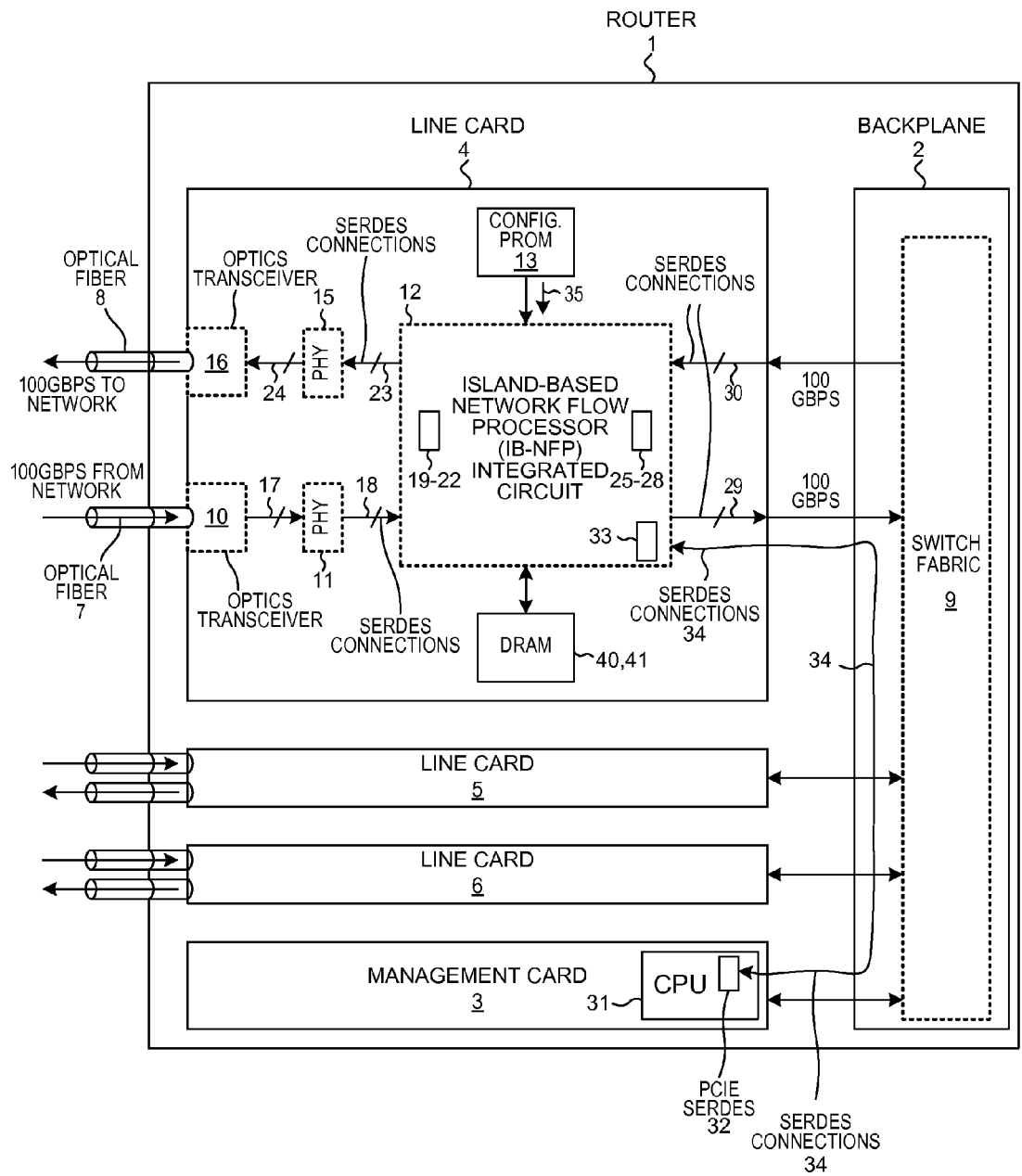
FIG. 1 is a simplified diagram of an MPLS (MultiProtocol Label Switching) router 1.

FIG. 1 is a simplified diagram of an MPLS (MultiProtocol Label Switching) router 1. Router 1 includes a backplane 2, a management card 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. In addition, each line card can receive 100 Gbps packet traffic from the switch fabric 9 of the backplane and can also transmit 100 Gbps packet traffic to the switch fabric. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9.

Line card 4 includes a first optical transceiver 10, a first PHY integrated circuit 11, an Island-Based Network Flow Processor (IB-NFP) integrated circuit 12, a configuration Programmable Read Only Memory (PROM) 13, an external memory such as Dynamic Random Access Memory (DRAM) 40-41, a second PHY integrated circuit 15, and a second optical transceiver 16. Packet data received from the network via optical cable 7 is converted into electrical signals by optical transceiver 10. PHY integrated circuit 11 receives the packet data in electrical form from optical transceiver 10 via connections 17 and forwards the packet data to the IB-NFP integrated circuit 12 via SerDes connections 18. In one example, the flows of packets into the IB-NFP integrated circuit from optical cable 7 is 100 Gbps traffic. A set of four SerDes circuits 19-22 within the IB-NFP integrated circuit 12 receives the packet data in serialized form from SerDes connections 18, deserializes the packet data, and outputs packet data in deserialized form to digital circuitry within IB-NFP integrated circuit 12.

Similarly, IB-NFP integrated circuit 12 may output 100 Gbps packet traffic to optical cable 8. The set of four SerDes circuits 19-22 within the IB-NFP integrated circuit 12 receives the packet data in deserialized form from digital circuitry within integrated circuit 12. The four SerDes circuits 19-22 output the packet data in serialized form onto SerDes connections 23. PHY 15 receives the serialized form packet data from SerDes connections 23 and supplies the packet data via connections 24 to optical transceiver 16. Optical transceiver 16 converts the packet data into optical form and drives the optical signals through optical cable 8. Accordingly, the same set of four duplex SerDes circuits 19-22 within the IB-NFP integrated circuit 12 communicates packet data both into and out of the IB-NFP integrated circuit 12.

IB-NFP integrated circuit 12 can also output packet data to switch fabric 9. Another set of four duplex SerDes circuits 25-28 within IB-NFP integrated circuit 12 receives the packet data in deserialized form, and serializes the packet data, and supplies the packet data in serialized form to switch fabric 9 via SerDes connections 29. Packet data from switch fabric 9 in serialized form can pass from the switch fabric via SerDes connections 30 into the IB-NFP integrated circuit 12 and to the set of four SerDes circuits 25-28. SerDes circuits 25-28 convert the packet data from serialized form into deserialized form for subsequent processing by digital circuitry within the IB-NFP integrated circuit 12.

Management card 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. CPU 31 includes a PCIE SerDes circuit 32. IB-NFP integrated circuit 12 also includes a PCIE SerDes 33. The configuration information passes from CPU 31 to IB-NFP integrated circuit 12 via SerDes circuit 32, SerDes connections 34 on the backplane, and the PCIE SerDes circuit 33 within the IB-NFP integrated circuit 12.

External configuration PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuits 40-41.

Figure 2:
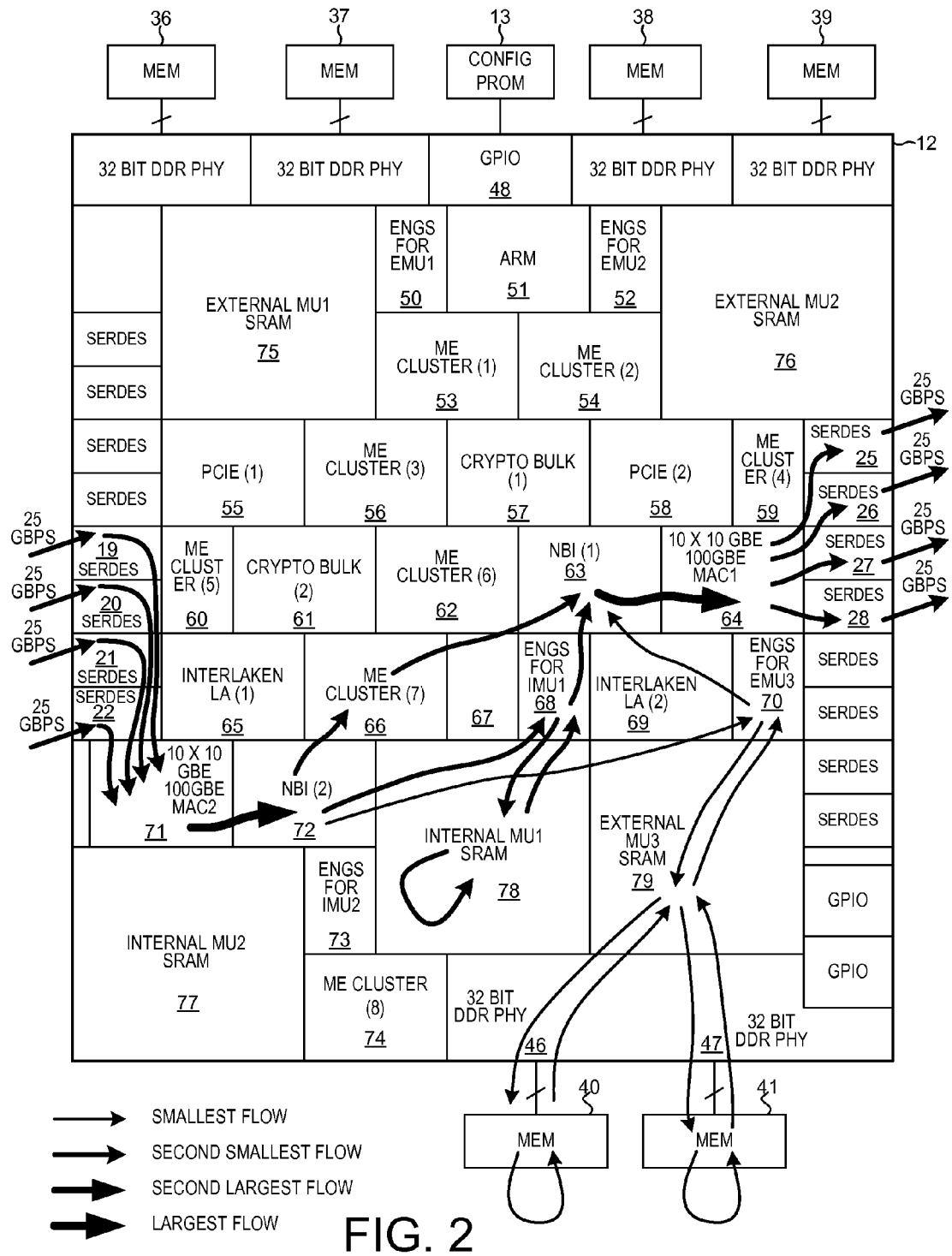
FIG. 2 is a schematic diagram that illustrates an operational example of IB-NFP integrated circuit 12 within the MPLS router 1 of FIG. 1.

FIG. 2 is a schematic diagram that illustrates an operational example of IB-NFP integrated circuit 12 within the MPLS router 1 of FIG. 1. 100 Gbps packet traffic is received via optical cable 7 (see FIG. 1), flows through optics transceiver 10, flows through PHY integrated circuit 11, and is received onto IB-NFP integrated circuit 12 spread across the four SerDes I/O blocks 19-22. Twelve virtual input ports are provided at this interface in the example of FIG. 1. The symbols pass through direct dedicated conductors from the SerDes blocks 19-22 to ingress MAC island 71. Ingress MAC island 71 converts successive symbols delivered by the physical coding layer into packets by mapping symbols to octets, by performing packet framing, and then by buffering the resulting packets for subsequent communication to other processing circuitry. The packets are communicated from MAC island 71 across a private inter-island bus to ingress NBI (Network Bus Interface) island 72. Although dedicated connections are provided for this purpose in the particular example described here, in other examples the packets are communicated from ingress MAC island 71 to ingress NBI island via the configurable mesh data bus.

For each packet, the functional circuitry of ingress NBI island 72 examines fields in the header portion to determine what storage strategy to use to place the packet into memory. In one example, the NBI island examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP.

In the operational example of FIG. 2, NBI island 72 examines a packet header, performs packet preclassification, determines that the packet is a fast-path packet, and determines that the header portion of the packet should be placed into a CTM (Cluster Target Memory) in ME (Microengine) island 66. The header portion of the packet is therefore communicated across the configurable mesh data bus from NBI island 72 to ME island 66. The CTM is tightly coupled to the ME. The ME island 66 determines header modification and queuing strategy for the packet based on the packet flow (derived from packet header and contents) and the ME island 66 informs a second NBI island 63 of these. In this simplified example being described, the payload portions of fast-path packets are placed into internal SRAM (Static Random Access Memory) MU block 78 and the payload portions of exception packets are placed into external DRAM 40 and 41.

Half island 68 is an interface island through which all information passing into, and out of, SRAM MU block 78 passes. The functional circuitry within half island 68 serves as the interface and control circuitry for the SRAM within block 78. For simplicity purposes in the discussion below, both half island 68 and MU block 78 may be referred to together as the MU island, although it is to be understood that MU block 78 is actually not an island as the term is used here but rather is a block. In one example, MU block 78 is an amount of so-called "IP" that is designed and supplied commercially by a commercial entity other than the commercial entity that designs and lays out the IB-NFP integrated circuit. The area occupied by block 78 is a keep out area for the designer of the IB-NFP in that the substantially all the wiring and all the transistors in block 78 are laid out by the memory compiler and are part of the SRAM. Accordingly, the mesh buses and associated crossbar switches of the configurable mesh data bus, the mesh control bus, and the mesh event bus do not pass into the area of block 78. No transistors of the mesh buses are present in block 78. There is an interface portion of the SRAM circuitry of block 78 that is connected by short direct metal connections to circuitry in half island 68. The data bus, control bus, and event bus structures pass into and over the half island 68, and through the half island couple to the interface circuitry in block 78. Accordingly, the payload portion of the incoming fast-path packet is communicated from NBI island 72, across the configurable mesh data bus to SRAM control island 68, and from control island 68, to the interface circuitry in block 78, and to the internal SRAM circuitry of block 78. The internal SRAM of block 78 stores the payloads so that they can be accessed for flow determination by the ME island.

In addition, a preclassifier in the ingress NBI island determines that the payload portions for others of the packets should be stored in external DRAM 40 and 41. For example, the payload portions for exception packets are stored in external DRAM 40 and 41. Interface island 70, IP block 79, and DDR PHY I/O blocks 46 and 47 serve as the interface and control for external DRAM integrated circuits 40 and 41. The payload portions of the exception packets are therefore communicated across the configurable mesh data bus from NBI island 72, to interface and control island 70, to external MU SRAM block 79, to 32-bit DDR PHY I/O blocks 46 and 47, and to external DRAM integrated circuits 40 and 41. At this point in the operational example, the packet header portions and their associated payload portions are stored in different places. The payload portions of fast-path packets are stored in internal SRAM in MU block 78, whereas the payload portions of exception packets are stored in external SRAM in external DRAMs 40 and 41.

ME island 66 informs second NBI island 63 where the packet headers and the packet payloads can be found and provides the second NBI island 63 with an egress packet descriptor for each packet. The egress packet descriptor indicates a queuing strategy to be used on the packet. Second NBI island 63 uses the egress packet descriptor to read the packet headers and any header modification from ME island 66 and to read the packet payloads from either internal SRAM 78 or external DRAMs 40 and 41. Second NBI island 63 places packet descriptors for packets to be output into the correct order. For each packet that is then scheduled to be transmitted, the second NBI island uses the packet descriptor to read the header portion and any header modification and the payload portion and to assemble the packet to be transmitted. Note that the header modification is not actually part of the egress packet descriptor, but rather it is stored with the packet header by the ME when the packet is presented to the NBI. The second NBI island then performs any indicated packet modification on the packet. The resulting modified packet then passes from second NBI island 63 and to egress MAC island 64.

Egress MAC island 64 buffers the packets, and converts them into symbols. The symbols are then delivered by conductors from the MAC island 64 to the four SerDes I/O blocks 25-28. From SerDes I/O blocks 25-28, the 100 Gbps outgoing packet flow passes out of the IB-NFP integrated circuit 12 and across SerDes connections 34 (see FIG. 1) and to switch fabric 9. Twelve virtual output ports are provided in the example of FIG. 1.

Figure 3:
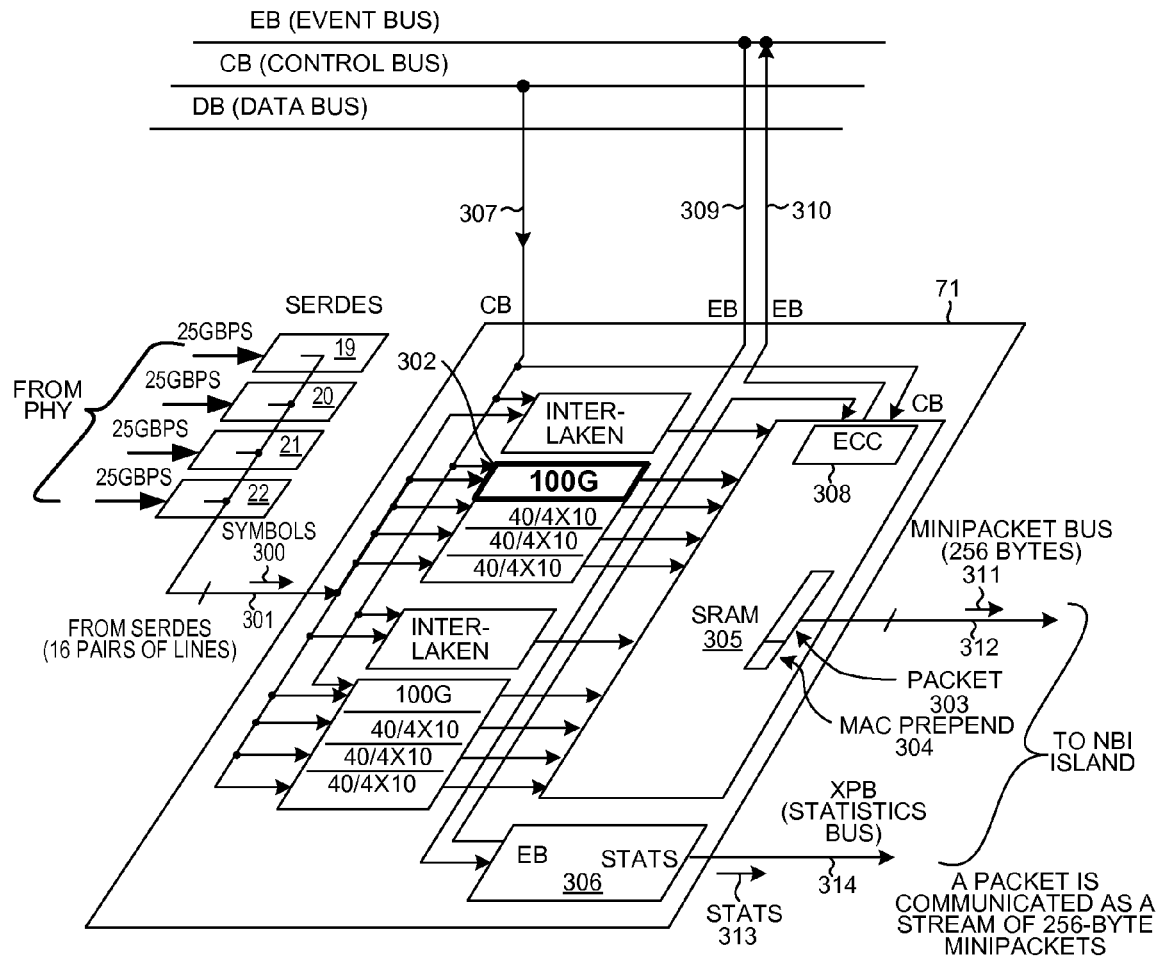
FIG. 3 is a diagram of the four SerDes I/O blocks 19-22 and the ingress MAC island 71 of IB-NFP integrated circuit 12.

FIG. 3 is a diagram of the four SerDes I/O blocks 19-22 and the ingress MAC island 71. The symbols 300 pass from the four SerDes I/O blocks and to the ingress MAC island across dedicated conductors 301. The symbols are converted into packets by a 100 Gbps ethernet block 302. The 100 Gbps ethernet block 302 analyzes the packets and places the results in this analysis at the beginning of the packet in the form of a "MAC prepend" value. The resulting packets and associated MAC prepend values are then buffered in SRAM 305. Reference numeral 303 identifies a part of the block that represents one packet and reference numeral 304 identifies a part of the block that represents the MAC prepend value. The MAC prepend value 304 includes: 1) an indication of the length of the packet, 2) an indication whether the packet is an IP packet, 3) and indication of whether the checksums are correct, and 4) a time stamp indicating when the packet was received.

As packets are loaded into SRAM, a statistics block 306 counts the number of packets that meet certain criteria. Various sub-circuits of the ingress MAC island are configurable. The input conductors 307 labeled CB couples the certain portions of the MAC island to the control bus tree so that these portions receive configuration information from the root of control bus tree. SRAM block 305 includes error detection and correction circuitry (ECC) 308. Error information detected and collected by ECC block 308 and statistics block 306 is reported through the local event bus and global event chain back to the ARM island 51. Ingress MAC island 71 is part of one of the local event rings. Event packets are circulated into the MAC island via conductors 309 and are circulated out of the MAC island via conductors 310. Packets that are buffered in SRAM 305 are then output from the MAC island to the ingress NBI island 72 in the form of one or more 256 byte minipackets 311 communicated across dedicated connections 312. Statistics information 313 is also communicated to the ingress NBI island 72 via dedicated connections 314.

Figure 4:
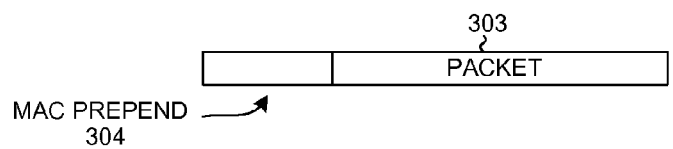
FIG. 4 is a diagram that illustrates how a packet is communicated as a sequence of minipackets across connections 312.

FIG. 4 is a diagram of packet 303 communicated across connections 312.

Figures 5, 6:
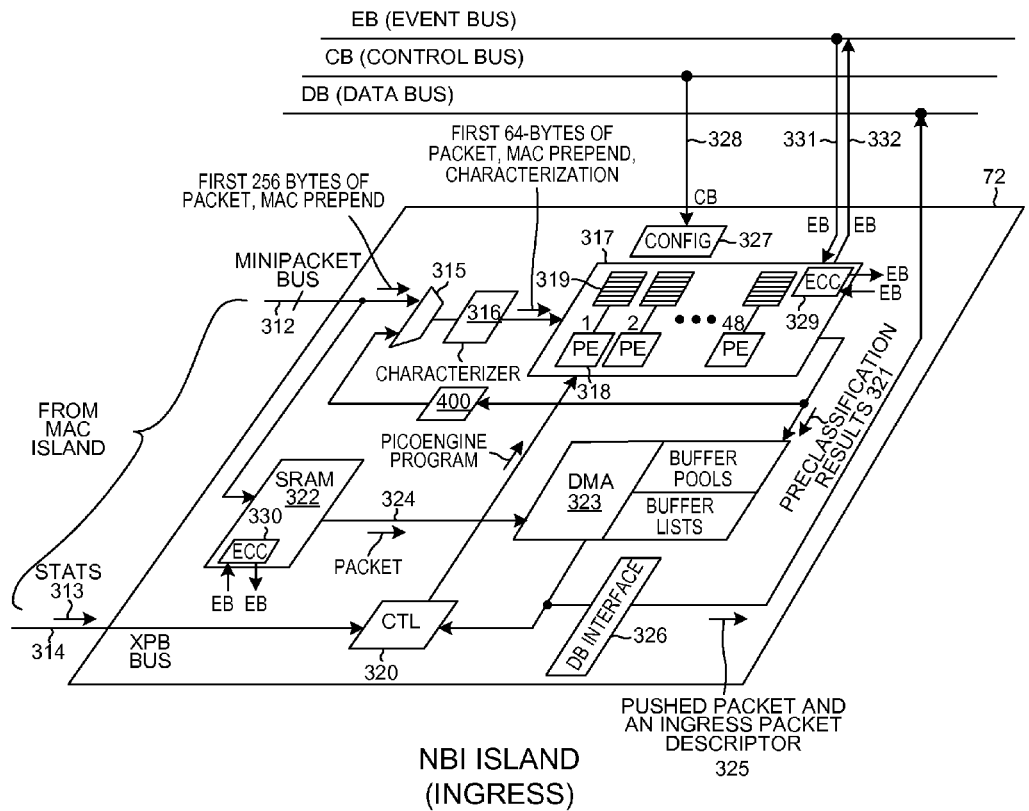
FIG. 5 is a diagram of ingress NBI island 72.
FIG. 6 is a table that sets forth the parts of preclassification results 321.

FIG. 5 is a diagram of ingress NBI island 72. Ingress NBI island 72 receives the MAC prepend and the minipackets via dedicated connections 312 from the ingress MAC island 72. The first 256 bytes of the packet and the MAC prepend pass through multiplexing circuitry 315 and to a characterizer 316. Characterizer 316 outputs characterization information, the first sixty-four bytes of the packet, and the MAC prepend. This is passed to a pool 317 of forty-eight picoengines. Each picoengine executes a program stored in an associated instruction control store. Reference numeral 318 identifies the first picoengine and reference numeral 319 identifies its instruction control store. The program in the instruction control store for each picoengine can be updated and changed under software control via control block 320. Control block 320 is also usable to receive the statistics information 313 from the MAC island via XPB bus connections 314. To perform deeper and deeper analysis into the header structure of an incoming packet, the output of the pool 317 can be passed back through a tunnel recirculation path and tunnel recirculation FIFO 400 to the characterizer 316 in an iterative fashion. Pool 317 outputs preclassification results 321.

FIG. 6 is a table that sets forth the part of preclassification results 321. The preclassification results 321 include: 1) a determination of which one of multiple buffer pools to use to store the packet, 2) a sequence number for the packet in a particular flow of packets through the IB-NFP, and 3) user metadata. The user metadata is typically a code generated by the picoengines, where the code communicates certain information about the packet. In the present operational example, the user metadata includes a bit. If the bit is set then the packet was determined to be of a first type (an exception packet), whereas if the bit is not set then the packet was determined to be of a second type (a fast-path packet).

The packet is buffered in SRAM 322. A buffer pool is a set of targets in ME islands where header portions can be placed. A buffer list is a list of memory addresses where payload portions can be placed. DMA engine 323 can read the packet out of SRAM via conductors 324, then use the buffer pools to determine a destination to which the packet header is to be DMA transferred, and use the buffer lists to determine a destination to which the packet payload is to be DMA transferred. The DMA transfers occur across the configurable mesh data bus. In the case of the exception packet of this example the preclassification user metadata and buffer pool number indicate to the DMA engine that the packet is an exception packet and this causes a first buffer pool and a first different buffer list to be used, whereas in the case of the fast-path packet the preclassification user metadata and buffer pool number indicate to the DMA engine that the packet is a fast-path packet and this causes a second buffer pool and a second buffer list to be used. Block 326 is data bus interface circuitry through which the configurable mesh data bus in accessed. Arrow 325 represents packets that are DMA transferred out of the NBI island 72 by DMA engine 323. Each packet is output with a corresponding ingress packet descriptor.

FIG. 7 is a table that sets forth the parts of an ingress packet descriptor. An ingress packet descriptor includes: 1) an address indicating where and in which ME island the header portion is stored, 2) an address indicating where and in which MU island the payload portion is, 3) how long the packet is, 4) a sequence number for the flow to which the packet belongs, 5) user metadata.

The programs stored in the instruction stores that are executable by the picoengines can be changed multiple times a second as the router operates. Configuration block 327 receives configuration information from the control bus CB tree via connections 328 and supplies the configuration information to various ones of the sub-circuits of NBI island 72 that are configurable. Error detection and correction (ECC) circuitry 329 collects error information such as errors detected in the contents of the instruction stores. ECC circuitry 329 and ECC circuitry 330 are coupled via connections 331 and 332 and other internal island connections not shown to be part of the local event ring of which the ingress MAC island 72 is a part.

Figure 9:
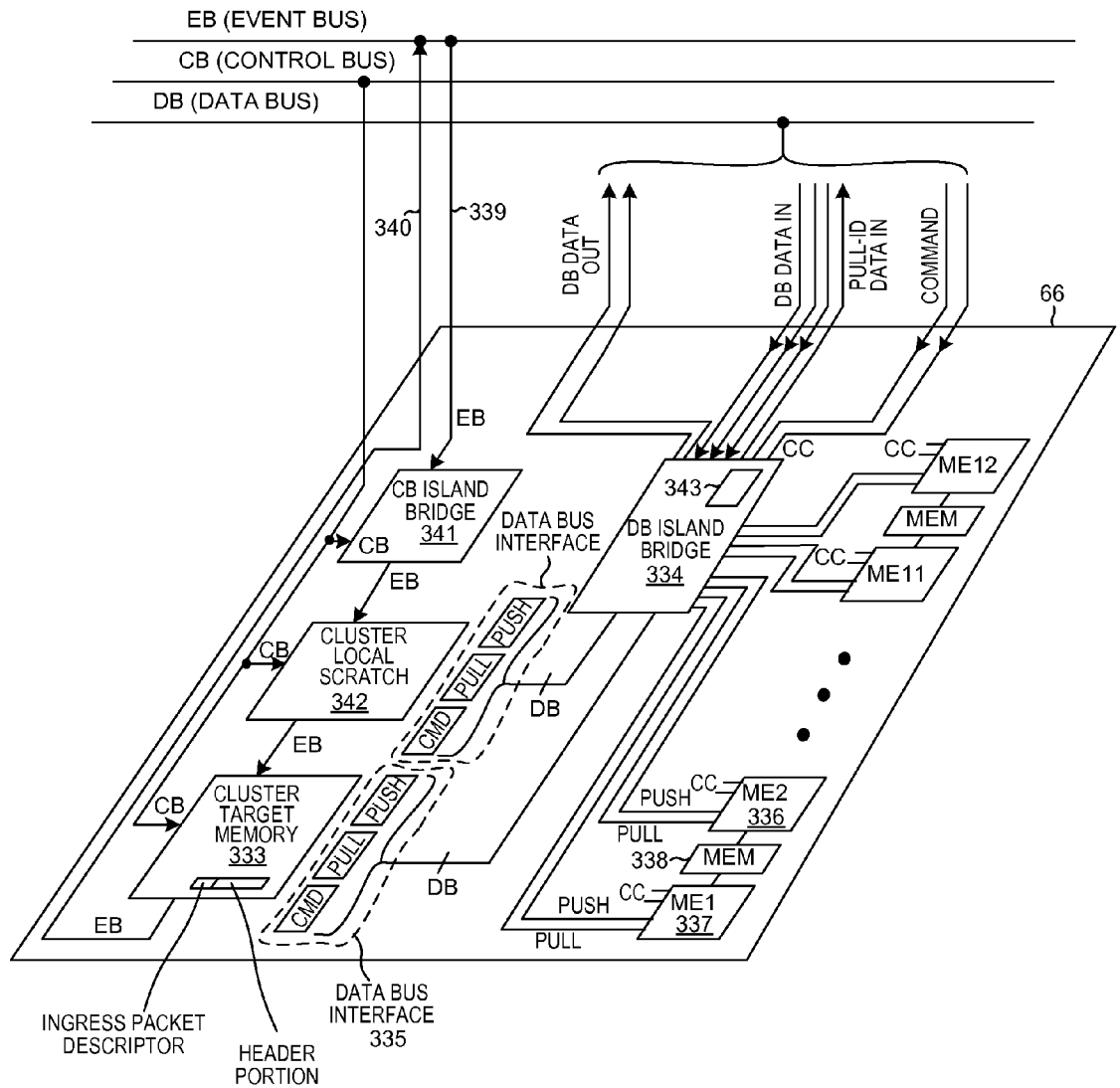
FIG. 9 is a diagram of the microengine (ME) island 66.

FIG. 9 is a diagram of the microengine (ME) island 66. In the present operational example, packet headers and the associated preclassification results are DMA transferred from the ingress NBI island 72 across the configurable mesh data bus and into the Cluster Target Memory (CTM) 333 of the ME island 66. The DMA engine 323 in the ingress NBI island is the master and the CTM 333 is the target for this transfer. The packet header portions and the associated ingress packet descriptors pass into the ME island via data bus island bridge 334 and data bus interface circuitry 335.

Once in the CTM 333, the header portions are analyzed by one or more microengines. The microengines have, through the DB island bridge 334, a command out interface, a pull-id in interface, a pull-data out interface, and a push data in interface. There are six pairs of microengines, with each pair sharing a memory containing program code for the microengines. Reference numerals 336 and 337 identify the first pair of picoengines and reference numeral 338 identifies the shared memory. As a result of analysis and processing, the microengines modify each ingress packet descriptor to be an egress packet descriptor as shown in FIG. 8. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is, 8) packet sequencer identification to be used by the reorder block in determining in-order packet transmissions, 9) a drop precedence value that indicates a variable drop probability for a instantaneous queue depth range, and 10) a priority indicator that indicates if the packet associated with the packet descriptor is a high priority packet or a low priority packet. One example of a high priority packet is a control plane packet. Another example of a high priority packet is a maintenance packet. On the contrary, one example of a low priority packet is an HTTP packet.

Memory errors and other events detected in the ME island are reported via a local event ring and the global event chain back to the ARM island 51. A local event ring is made to snake through the ME island for this purpose. Event packets from the local event chain are received via connections 339 and event packets are supplied out to the local event chain via connections 340. The CB island bridge 341, the cluster local scratch 342, and CTM 333 can be configured and are therefore coupled to the control bus CB via connections 343 so that they can receive configuration information from the control bus CB.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as described above as if the memory were outside the island in another island, except that bus transaction values do not have a final destination value. The bus transaction values do not leave the ME island and therefore do not need the final destination information. If, on the other hand, the target is not local within the ME island then intelligence 343 within the DB island bridge adds the final destination value before the bus transaction value is sent out onto the configurable mesh data bus. From the perspective of the microengine master, the interaction with the target has the same protocol and command and data format regardless of whether the target is local or remote.

Figure 10:
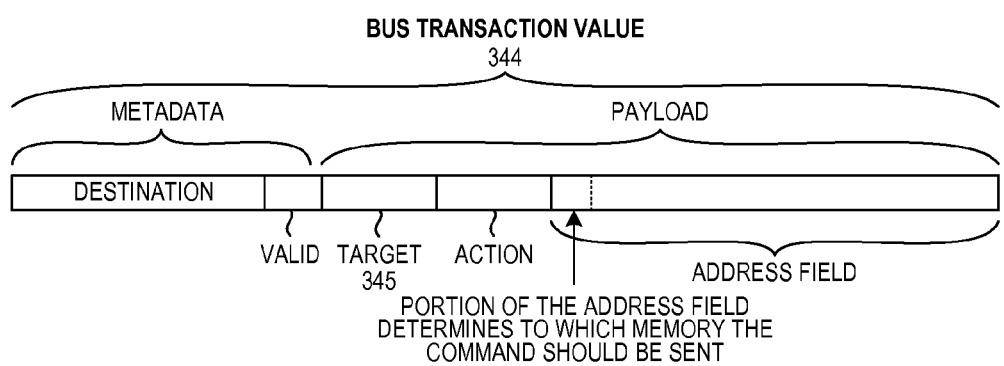
FIG. 10 is a bit sequence map of a bus transaction value used to communicate packet data from the ingress NBI island 72 to the ME island 66 across the CPP data bus.

FIG. 10 is a diagram of a bus transaction value 344 used to communicate packet data from the ingress NBI island 72 to the ME island 66. In a multi-target island such as the ME island 66, the target field 345 of the bus transaction value contains a number that indicates which target it is that is to receive the payload of the bus transaction value. In the present example, the header portions of the incoming 100 Gbps flow are written into CTM 333.

Figure 11:
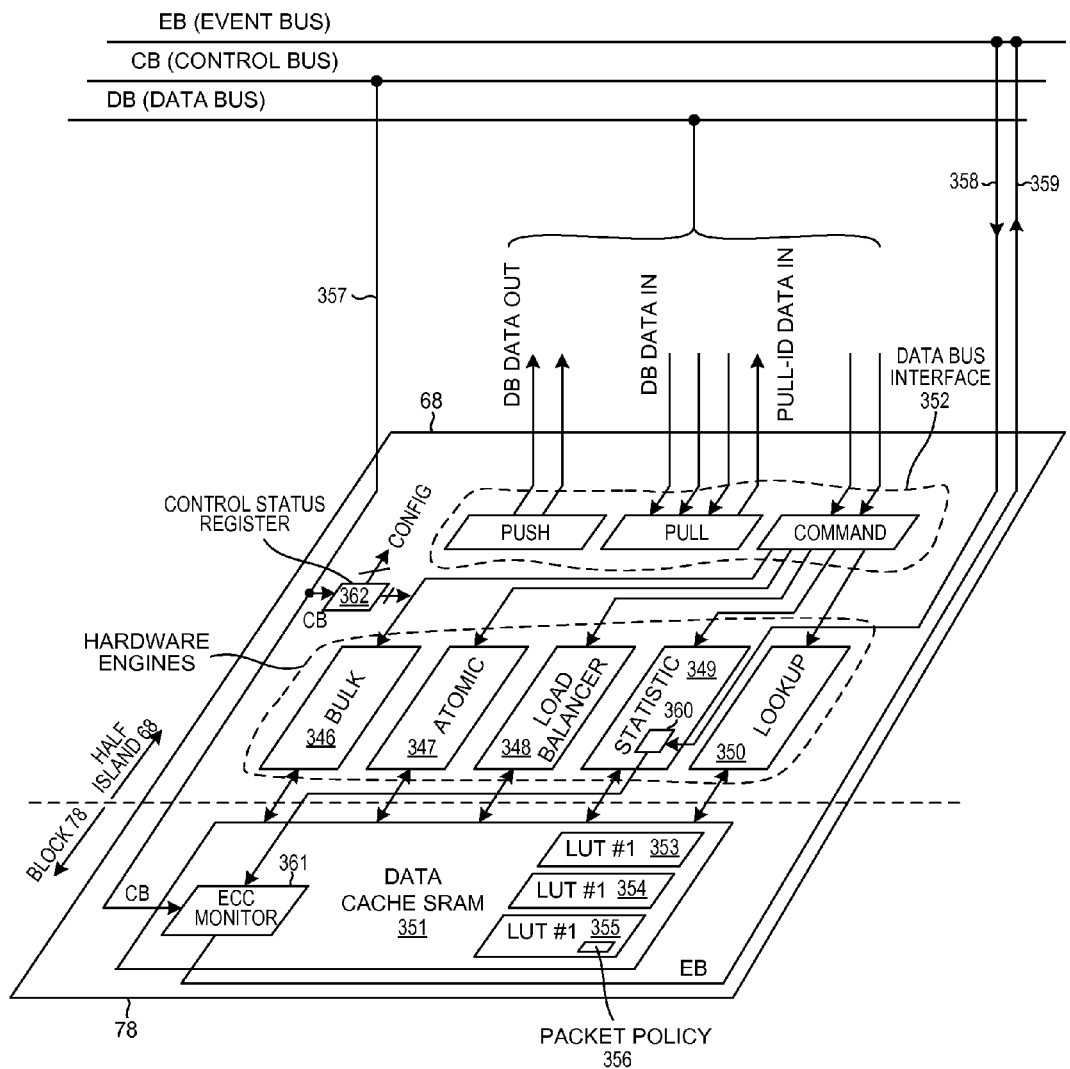
FIG. 11 is a diagram of MU half island 68 and associated SRAM block 78.

FIG. 11 is a diagram of MU half island 68 and SRAM block 78. MU half island 68 includes several hardware engines 350. In the operational example, packet payloads are DMA transferred directly from ingress NBI island 72 and across the configurable mesh data bus, through data bus interface 352 of half island 68, and into the data cache SRAM 351 block 78. The ingress NBI DMA engine 323 issues a bulk write command across the configurable mesh data bus to the bulk transfer engine 346. The destination is the MU island. The action is bulk write. The address where the data is to be written into the MU island is the address taken out of the appropriate buffer list. The bulk write command received at the MU is a bulk write, so the data bus interface 352 presents the command to the bulk engine. The bulk engine examines the command which is a write. In order to perform a write the bulk engine needs data, so the bulk engine issues a pull-id through the pull portion of interface 352, which in turn issues a pull-id back onto the configurable mesh data bus. The NBI DMA engine 323 receives the pull-id. Part of the pull-id is a data reference which indicates to the DMA engine which part of the packet is being requested as data. The DMA engine uses the data reference to read the requested part of the packet, and presents that across the data part of the data bus back to the bulk engine 346. The bulk engine 346 then has the write command and the packet data. The bulk engine 346 ties the two together, and it then writes the packet data into the SRAM 351 at the address given in the write command. In this way, packet payload portions pass from DMA engine in the ingress NBI island, across the configurable mesh data bus, through the data bus interface 352, through a bulk transfer engine 346, and into data cache SRAM 351.

In the present operational example, a microengine in the ME island 66 issues a lookup command across the configurable mesh data bus to have lookup hardware engine 350 examine tables in SRAM 351 for the presence of given data. The data to be looked for in this case is a particular MPLS label. The lookup command as received onto the MU island is a lookup command so the data base interface 352 presents the lookup command to the lookup engine. The lookup command includes a table descriptor of what part to memory to look in. The lookup command also contains a pull-id reference indicating what to look for (the MPLS label in this case). The data to look for is actually stored in transfer registers of the originating microengine. The lookup engine 350 therefore issues a pull-id out onto the configurable mesh data bus request back to the originating microengine. The microengine returns the requested data (the MPLS label to look for) corresponding to the reference id. The lookup engine now has the lookup command, the table descriptor, and the MPLS label that it is to look for. In the illustration there are three tables 353-355. A table description identifies one such table by indicating the starting address of the table in SRAM 351, and how large the table is. If the lookup operation is successful in that the lookup hardware engine 350 finds the MPLS label in the table identified by the table descriptor, then the lookup hardware engine 350 returns a predetermined value "Packet Policy" 356 back to the requesting microengine. A packet policy is a code that indicates: 1) a header modification to be done, and 2) a queuing strategy to use. Lookup engine 350 returns the packet policy 356 to the originating microengine by pushing the data (the packet policy) via the push interface of the configurable mesh data bus.

Various parts of the MU island are configurable by changing the contents of registers and memory via the control bus CB and connections 357 and control status registers 362. Errors detected on the MU island by circuits 360 and 361 are reported into a local event ring. Event packets from the local event ring are received via input connections 358 and the MU island outputs event packets to the local even ring via output connections 359. Various sub-circuits of the MU island are configurable.

Figure 12:
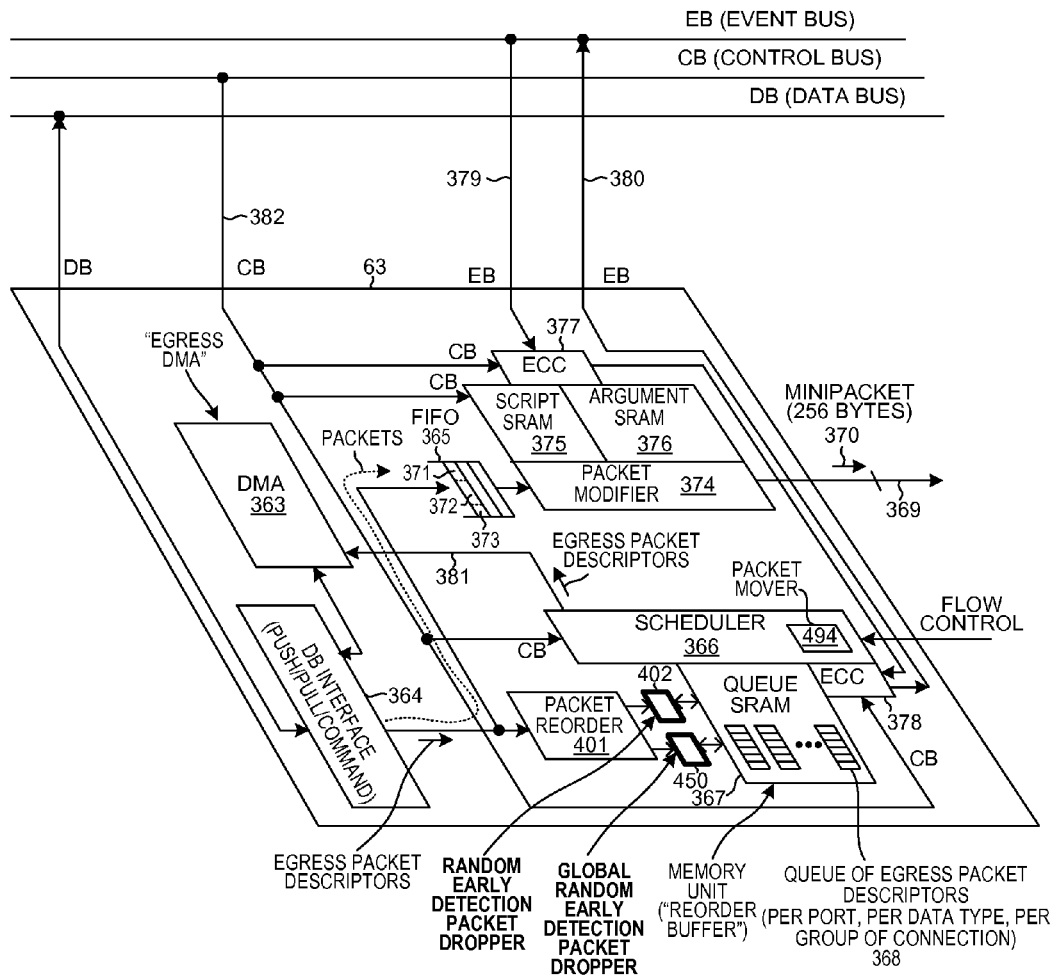
FIG. 12 is a diagram of egress NBI island 63.

FIG. 12 is a diagram of egress NBI island 63. In the operational example, ME island 66 instructs the egress NBI island 63 to transmit a packet by supplying the egress NBI island with an egress packet descriptor of the packet to be transmitted. The ME island supplies the egress packet descriptor to the egress NBI island by issuing a transmit packet command across the configurable mesh data bus and to the packet reorder block 401. The packet reorder block 401 responds by pulling the packet descriptor from the ME island across the configurable mesh data bus. In this way, multiple egress packet descriptors enter packet reorder block 401. These egress packet descriptors are reordered so that the descriptors for the packets of a flow are in proper sequence. The scheduler 366 receives the properly ordered egress packet descriptors and pushes them onto appropriate queues in queue SRAM 367. Each such queue of egress packet descriptors is per port, per data type, per group of connections. Reference numeral 368 identifies one such queue. Packets of a connection in this case share the same set of source and destination IP addresses and TCP ports. Scheduler 366 schedules packets to be transmitted by popping egress packet descriptors off the queues in appropriate orders and at appropriate times, and by supplying the popped egress packet descriptors via conductors 381 to the DMA engine 363.

The egress packet descriptor is received by Random Early Detection (RED) packet dropper with drop precedence 402 from packet reorder block 401. RED packet dropper with drop precedence 402 determines if the egress packet descriptor is to be dropped or is to be stored in the queue of egress packet descriptors. Storing the egress packet descriptor in the queue causes the packet associated with the egress packet descriptor to be transmitted. Alternatively, not storing the egress packet descriptor in the queue causes the packet associated with the egress packet descriptor to not be transmitted. Random early detection packet drop with drop precedence determines the probability of dropping a packet not only based upon that instantaneous queue depth, but also a drop precedence value that is included in the egress packet descriptor. The drop precedence is a control to vary the drop probability applied to a packet. The drop precedence value allows variable drop probabilities to be assigned to a single queue depth across various queues. The assigning of the variable drop probabilities to a single queue depth across various queues is advantageous because different queues operate to communicate different types of packets which may have different levels of priority (or importance). For example, the first queue may operate to communicate control flow information (high-priority information) for which you want to rarely drop the packet, while a second queue may operate to communicate HTTP traffic (low priority information) for which you want to more frequently drop packets.

The egress packet descriptor is also received by global Random Early Detection (RED) packet dropper 450 from packet reorder block 401. Global RAD E450 determines if the egress packet descriptor is to be dropped or is to be stored in the queue of egress packet descriptors. Storing the egress packet descriptor in the queue causes the packet associated with the egress packet descriptor to be transmitted. Alternatively, not storing the egress packet descriptor in the queue causes the packet associated with the egress packet descriptor not be transmitted. Global RED determines the amount of free memory that is available in all descriptor queues. Based on the amount of free memory that is available in all descriptor queues, the. Global RED determines the probability of dropping a packet, based on the amount of free memory that is available in all descriptor queues and the priority of the packet associated with the egress packet descriptor. The global RED packet dropper can be configured to vary the probability of dropping a packet for different ranges of free queue memory. Assigning a drop probability based on the amount of free memory that is available in all descriptor queues is advantageous because it provides a mechanism to ensure that free queue memory will be available for future high-priority packets. For example, if the free queue memory falls below 10% of the total queue memory and a group of high-priority packets then need to be transmitted, there would be a high probability that some of the high-priority packets would be dropped due to a lack of free queue memory. However, utilization of the global RED packet dropper will help to ensure that the minimum amount of free queue memory required to communicate a group of high-priority packets will always be available. Thereby significantly reducing the probability that high priority packets will be dropped by the network flow processor.

As described above, egress packet descriptors can be written to memory unit 367 by both RED packet dropper 402 and the global RED packet dropper 450. Logic included in memory unit 367 processes the input from both packet dropper 402 and 450 and makes a final determination as to whether or not the packet is to be dropped. This functionality is described in greater detail below.

DMA engine 363 receives such an egress packet descriptor, and based on the information in the descriptor, transfers the payload portion and the header portion of the packet across configurable mesh data bus and DB interface 364 and into FIFO 365. In the illustration of FIG. 6, each entry in FIFO 365 includes a complete packet having the header portion 371, the payload portion 372, and a script identifier portion 373. The script identifier portion 373 was added by the ME island. As a result of the lookup performed at the direction of the ME island, a packet policy was determined, and part of this packet policy is an indication of what of the packet header to change and how to change it before the packet is transmitted. An example of such a modification is to change the MAC source and destination addresses at the time the packet is output from the IB-NFP.

In a typical MPLS router, the MPLS labels of packets can remain the same as the packets flow into and through and out of the router. The MAC addresses of such a packet, however, should be changed on a hop by hop basis. The MAC hop on the ingress may be different from the MAC address on the egress. Accordingly, the packet exiting the MPLS router should have its source and destination MAC addresses changed to be appropriate for the next MAC hop into which the packet will be transmitted. The ME island supplies a script identifier portion for each packet for this purpose. The script identifier portion includes a code that identifies one of the scripts present in script SRAM 375. The identified script, when executed by packet modifier 374, causes the MAC addresses for the associated packet to be changed to values stored in an associated argument SRAM 376. Each resulting modified packet is then output from the egress NBI island 63 as a sequence of 256 byte minipackets across dedicated connections 369 to egress MAC island 64. Reference numeral 370 identifies one such minipacket.

Error conditions detected by ECC circuits 377 and 378 are injected into a local event ring in the form of event packets. Event packets from the local event ring are received onto the egress NBI island via connections 379, and event packets from the egress NBI island are supplied through the remainder of the local event ring via connections 380. Various parts of the egress NBI island are configurable.

Configuration information for this purpose is received onto the egress NBI island from the control bus CB via connections 382.

Figure 13:
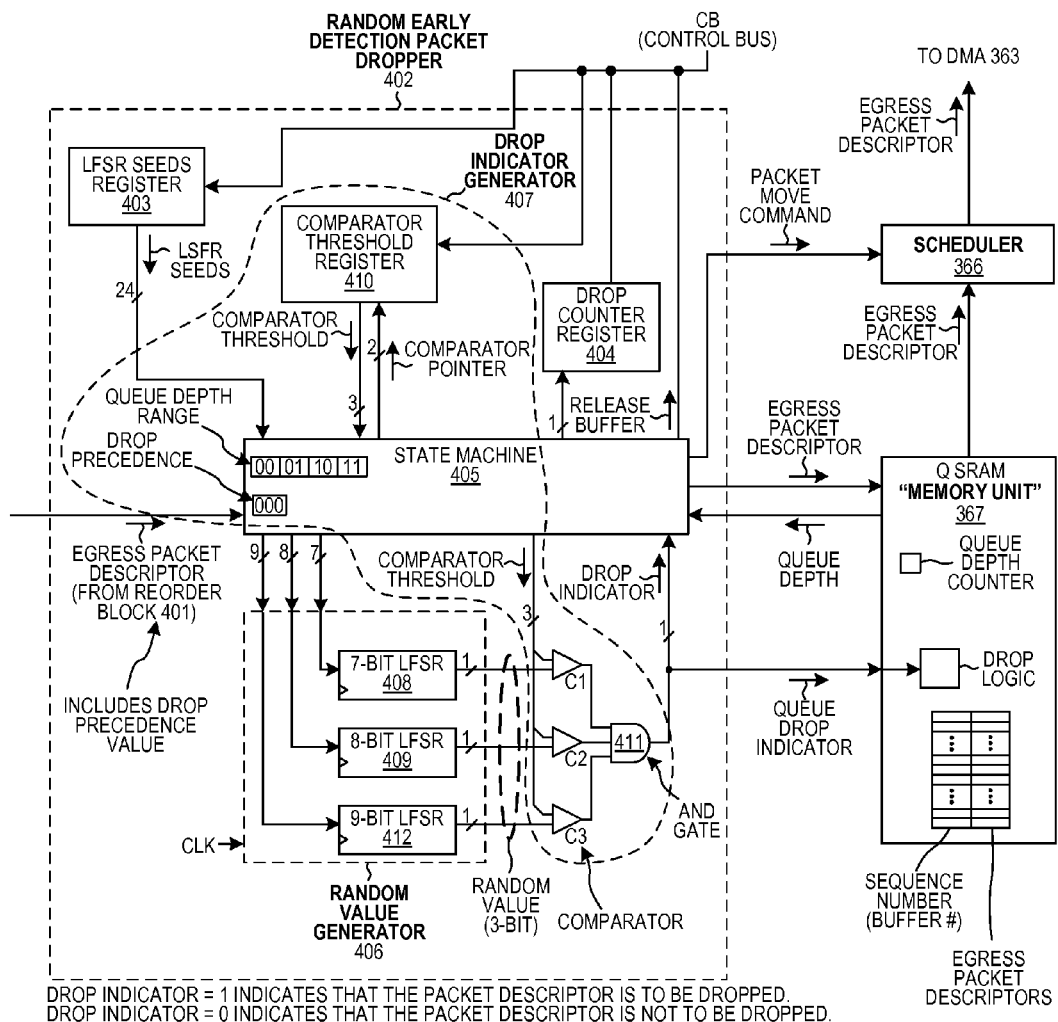
FIG. 13 is a diagram of a first example of a Random Early Detection (RED) packet dropper with drop precedence 402.

FIG. 13 is a diagram of Random Early Detection (RED) packet dropper with drop precedence 402. RED packet dropper with drop precedence 402 is a first example of a RED packet dropper with drop precedence. RED packet dropper with drop precedence 402 is also referred to as a "Queue RED dropper circuit" herein. RED packet dropper with drop precedence 402 includes Linear Feedback Shift Register (LFSR) 403, drop count register 404, state machine 405, random value generator 406, and drop indicator generator 407. Random value generator 406 includes a seven-bit LFSR 408, eight-bit LFSR 409 and nine-bit LFSR 420. Drop indicator generator 407 includes comparator threshold register 410, comparators C1-C3, and AND gate 411. State machine 405 receives egress packet descriptors (packet descriptors). As discussed above in FIG. 8, egress packet descriptors include a queue number (also referred to as a "queue indicator") and a drop precedence value that is associated with the queue. In another example, both the queue number and the drop precedence value may be communicated to the RED packet dropper 402 independently from the egress packet descriptor. The state machine 405 utilizes drop indicator generator 407 and random value generator 406 to determine if a packet descriptor is to be dropped or is to be transmitted. In the event it is determined that the packet descriptor is to be transmitted, the state machine 405 causes the packet descriptor to be stored in queue number indicated in the packet descriptor. Storing the packet descriptor in the queue will cause the packet descriptor to later be read from the queue within the memory unit 367 and communicated to scheduler 366. Upon receiving the packet descriptor, scheduler 366 will cause a packet associated with the packet descriptor to be transmitted. In the event it is determined that the packet descriptor is to be dropped, the state machine 405 causes the packet descriptor to not be stored in any queue. Not storing the packet descriptor in the queue will cause the packet associated with the packet descriptor to not be transmitted. When the packet descriptor is not stored in the queue the state machine 405 will also increment a value stored in the drop counter register 404 and send a release buffer signal to the buffer location storing the packet associated with the packet descriptor.

Figure 14:
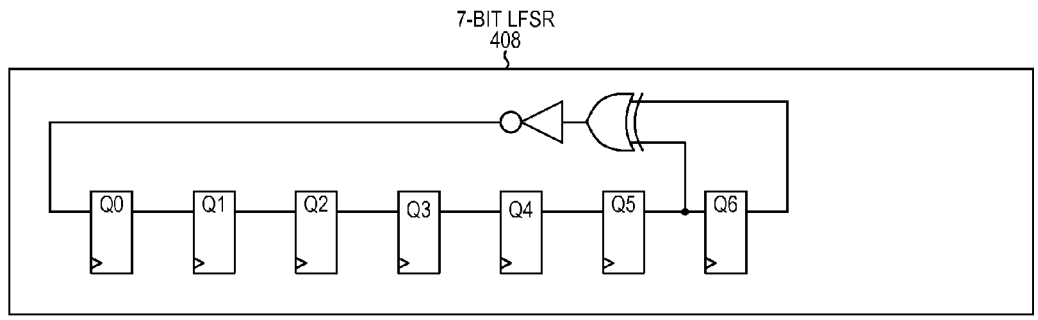
FIG. 14 is a diagram of 7-bit Linear Feedback Shift Register (LFSR) 408.
Figure 15:
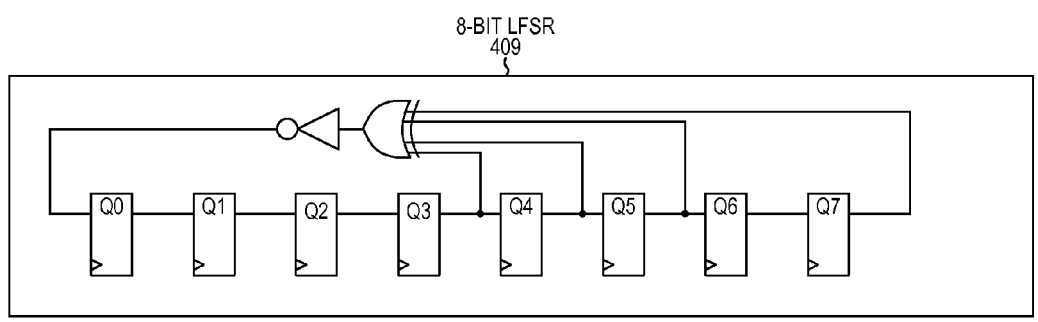
FIG. 15 is a diagram of 8-bit Linear Feedback Shift Register (LFSR) 409.
Figure 16:
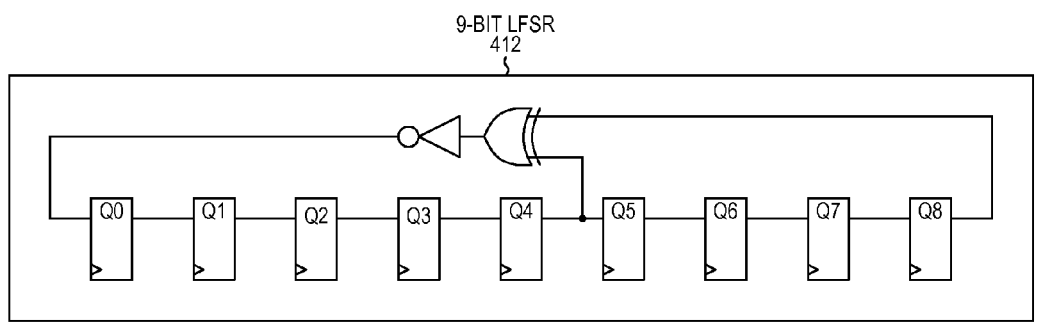
FIG. 16 is a diagram of 9-bit Linear Feedback Shift Register (LFSR) 412.

In operation, the state machine 405 receives the egress packet descriptor from reorder block 401. In response to receiving the egress packet descriptor, state machine 405 reads the LFSR seeds from LFSR seeds register 403 and communicates the LFSR seeds to random value generator 406. In one example, random value generator 406 includes three LFSRs 408, 409 and 420. These LFSRs are illustrated in greater detail in FIGS. 14-16, respectively. LFSR 408 is a seven-bit LFSR that is programmed with a seven-bit seed and outputs a single random bit. LFSR 409 is an eight-bit LFSR that is programmed with an eight-bit seed and outputs a single random bit. LFSR 420 is a nine-bit LFSR that is programmed with a nine-bit seed and outputs a single random bit. Each of the LFSR output bits are combined to create a random value (3-bits). Upon receiving the egress packet descriptor the state machine 405 also determines the instantaneous queue depth of the queue indicated in the egress packet descriptor. In one example, the state machine 405 determines the instantaneous queue depth by reading the contents of a queue depth register within the memory unit 367. The instantaneous queue depth (i.e. how many packet descriptors are stored in the queue) is kept track incrementing the queue depth value stored in the queue depth register when a new packet descriptor is written to the queue and decrementing the queue depth value stored in the queue depth register when a packet descriptor is read from the queue. It is noted that the instantaneous queue depth is not the same as measuring an average queue depth. The instantaneous queue depth is the depth of the queue at the time the egress packet descriptor is received and does not depend on the depth of the queue at any time before the egress packet descriptor was received.

Once the queue depth is determined, the state machine 405 determines in which of four queue depth ranges (1-4) the queue depth is within. The queue depth range (1-4) is concatenated with the drop precedence value to create a comparator pointer. The comparator pointer is then used to select one of the thirty-two comparator threshold values stored in comparator threshold register 410. The selected comparator threshold is then communicates to comparators C1-C3. In one example, the first bit of the comparator threshold is communicated to a first terminal of comparator C1 and the output of LFSR 408 is communicated to a second terminal of comparator C1, the second bit of the comparator threshold is communicated to a first terminal of comparator C2 and the output of LFSR 409 is communicated to a second terminal of comparator C2, and the third bit of the comparator threshold is communicated to a first terminal of comparator C3 and the output of LFSR 420 is communicated to a second terminal of comparator C3. The output of comparator C1 is a logic high ("1") only when the output of LFSR 408 is greater than the first bit of the comparator threshold. The output of comparator C2 is a logic high ("1") only when the output of LFSR 409 is greater than the second bit of the comparator threshold. The output of comparator C3 is a logic high ("1") only when the output of LFSR 420 is greater than the third bit of the comparator threshold. The output of each comparator (C1-C3) is ANDed together by AND gate 411. The output of AND gate 411 is a logic high ("1") only when all three input terminals of AND get 411 are a logic high ("1"). The output of AND gate 411 is the drop indicator.

When the drop indicator is a logic high ("1"), the state machine 405 drops the packet descriptor (i.e. the packet descriptor is not stored in the queue within the memory unit 367) and the state machine 405 increments the drop counter value stored in the drop counter register by one and communicates a release buffer signal to the buffer that stores the packet associated with the packet descriptor. The release buffer signal is sent to the buffer storing the associated packet so to release the buffer for storage of another packet because the RED packed dropper with drop precedence has determined that the packet is not to be transmitted.

When the drop indicator is a logic low ("0"), the state machine 405 causes the egress packet descriptor to be stored in the queue in the memory unit 367. The drop counter value stored in the drop counter register 404 is not incremented and a release buffer signal is not sent to the buffer storing the packet associated with the egress packet descriptor because the RED packet dropper with drop precedence has determined that the packet is to be transmitted. The egress packet descriptor is then communicated from the queue in memory unit 367 to scheduler 366. Scheduler 366 then communicates the egress packet descriptor to DMA 363 which causes the packet associated with the egress packet descriptor to be transmitted.

Setting of the RED packet dropper can be programmed by a processor across a command bus interface. For example, the LFSR seeds used by the random value generator 406 can be modified by writing new LFSR seeds into LFSR seeds register 403 across the control bus. The drop count value stored in the drop counter register can be cleared or read across the control bus by another processor on the control bus. Likewise, the comparator thresholds stored in the comparator threshold register 410 can be modified by writing new comparator thresholds into the comparator threshold register across the control bus. This programmability allows for adjustable operation of drop probabilities during operation.

Figure 17:
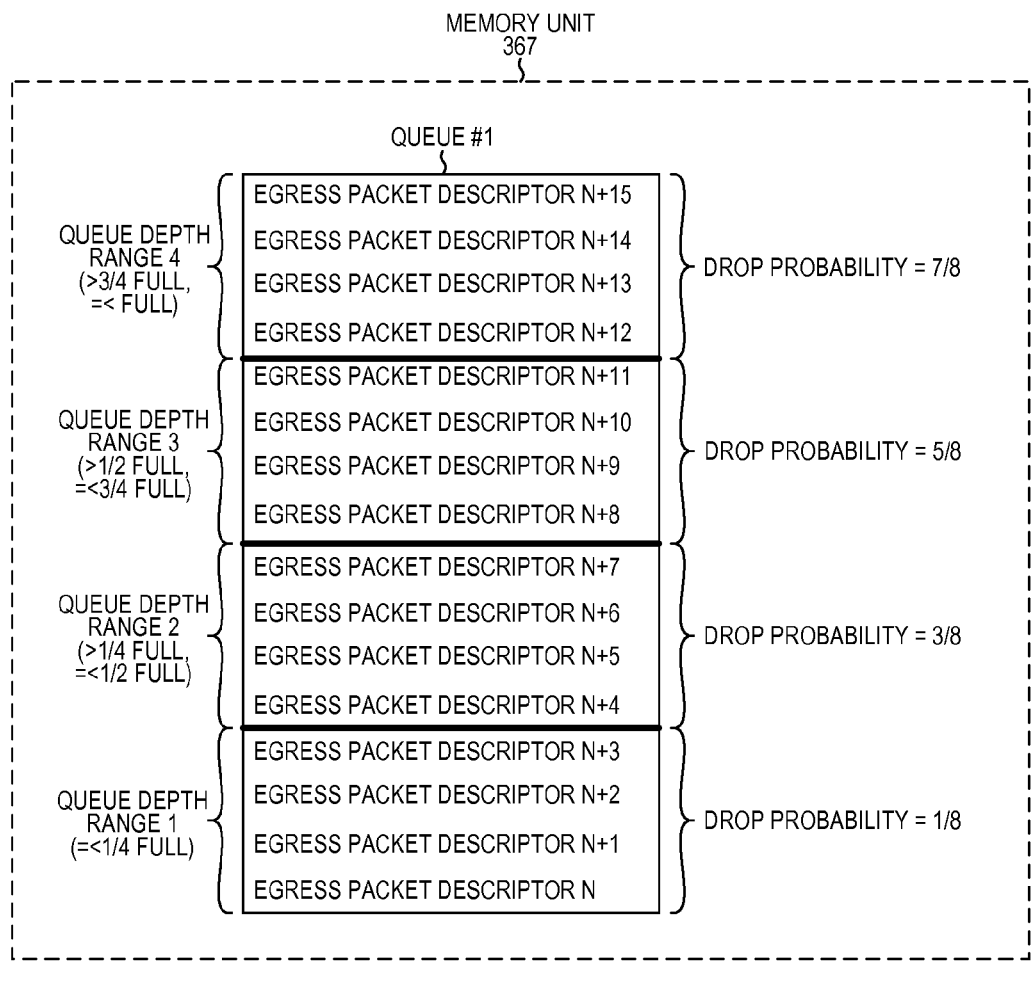
FIG. 17 is a diagram of Queue #1 stored in memory unit 367.

FIG. 17 is diagram of a queue stored in memory unit 367. FIG. 17 also illustrates four queue depth ranges and associated drop probabilities of the queue. The first queue depth range (Queue Depth Range 1) includes egress packet descriptors N to N+3. The desired drop probability for all egress packet descriptors within queue depth range 1 is ⅛. The second queue depth range (Queue Depth Range 2) includes egress packet descriptors N+4 to N+7. The desired drop probability for all egress packet descriptors within queue depth range 2 is ⅜. The third queue depth range (Queue Depth Range 3) includes egress packet descriptors N+8 to N+11. The desired drop probability for all egress packet descriptors within queue depth range 3 is ⅝. The fourth queue depth range (Queue Depth Range 4) includes egress packet descriptors N+12 to N+15. The desired drop probability for all egress packet descriptors within queue depth range 4 is ⅞.

Figure 18:
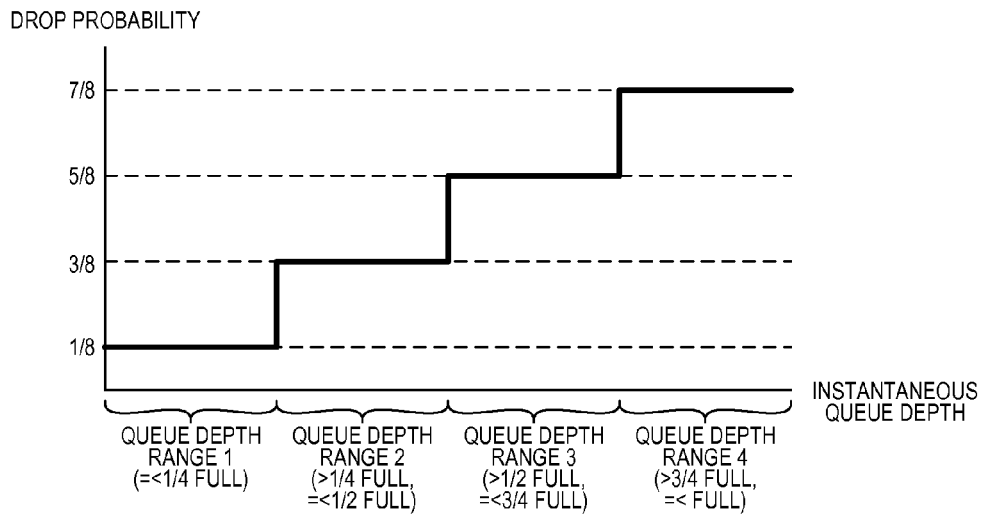
FIG. 18 is a diagram illustrating the probability of dropping a packet descriptor for each queue depth range.

A graph of the drop probability verse queue depth range is shown in FIG. 18. FIG. 18 is an example of a drop profile that could be implemented using the present invention. It is noted herein, that the present invention could be utilized to implement many other drop profiles by reconfiguring the registers within the RED packet dropper.

Figure 19:
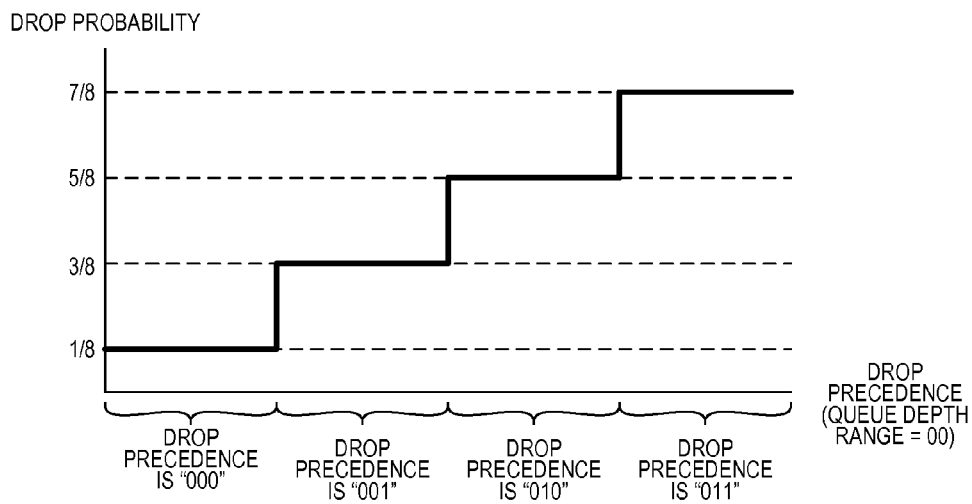
FIG. 19 is a diagram illustrating the drop probability versus drop precedence value for a single instantaneous queue depth for a single queue.

FIG. 19 illustrates a graph of drop probability versus drop precedence value for a single instantaneous queue depth of a single queue. In one example, the instantaneous queue depth is within range 00 and the drop precedence value is 000. In this example the drop probability resulting from this combination of instantaneous queue depth and drop precedence value is ⅛. A second example, the instantaneous queue depth is within the range 00 and the drop precedence value is 001. In this example, the drop probability resulting from this combination of instantaneous queue depth and drop precedence value is ⅜. In a third example, the instantaneous queue depth is within the range 00 and drop precedence value is 010. In this example, the drop probability resulting from this combination of instantaneous queue depth and drop precedence value is ⅝. In a fourth example, the instantaneous queue depth is within the range 00 and the drop precedence value is 011. In this example the drop probability resulting from this combination of instantaneous queue depth and drop precedence value is ⅞.

FIGS. 20-23 illustrate how the RED packet dropper with drop precedence 402 generates the drop indicator and how the drop indicator changes as the drop precedence value is varied. FIG. 20 is a table listing all possible random values, the comparator value for queue depth range 00 and drop precedence value 000, and the resulting drop indicators. As described earlier, the drop indicator is only a logic high ("1") when all bits of the random value are greater than the all the bits of the comparator threshold. The comparator threshold for queue depth range 00 and drop precedence value 000, is "110" so that only one of eight possible random values is greater than the comparator threshold. Thereby, creating a ⅛ probability that the random value will be greater than the comparator threshold and therefore a ⅛ probability the egress packet descriptor will be dropped.

FIG. 21 is a table listing all possible random values, the comparator value for queue depth range 00 and drop precedence value 001 and the resulting drop indicators. As described earlier, the drop indicator is only a logic high ("1") when all bits of the random value are greater than the all the bits of the comparator threshold. The comparator threshold for queue depth range 00 and drop precedence value 001, is "100" so that only three of eight possible random values is greater than the comparator threshold. Thereby, creating a ⅜ probability that the random value will be greater than the comparator threshold and therefore a ⅜ probability the egress packet descriptor will be dropped.

FIG. 22 is a table listing all possible random values, the comparator value for queue depth range 00 and drop precedence value 010 and the resulting drop indicators. As described earlier, the drop indicator is only a logic high ("1") when all bits of the random value are greater than the all the bits of the comparator threshold. The comparator threshold for queue depth range 00 and drop precedence value 010, is "010" so that five of eight possible random values is greater than the comparator threshold. Thereby, creating a ⅝ probability that the random value will be greater than the comparator threshold and therefore a ⅝ probability the egress packet descriptor will be dropped.

FIG. 23 is a table listing all possible random values, the comparator value for queue depth range 00 and drop precedence value 011 and the resulting drop indicators. As described earlier, the drop indicator is only a logic high ("1") when all bits of the random value are greater than the all the bits of the comparator threshold. The comparator threshold for queue depth range 00 and drop precedence value 011, is "000" so that seven of eight possible random values is greater than the comparator threshold. Thereby, creating a ⅞ probability that the random value will be greater than the comparator threshold and therefore a ⅞ probability the egress packet descriptor will be dropped.

Figure 24:
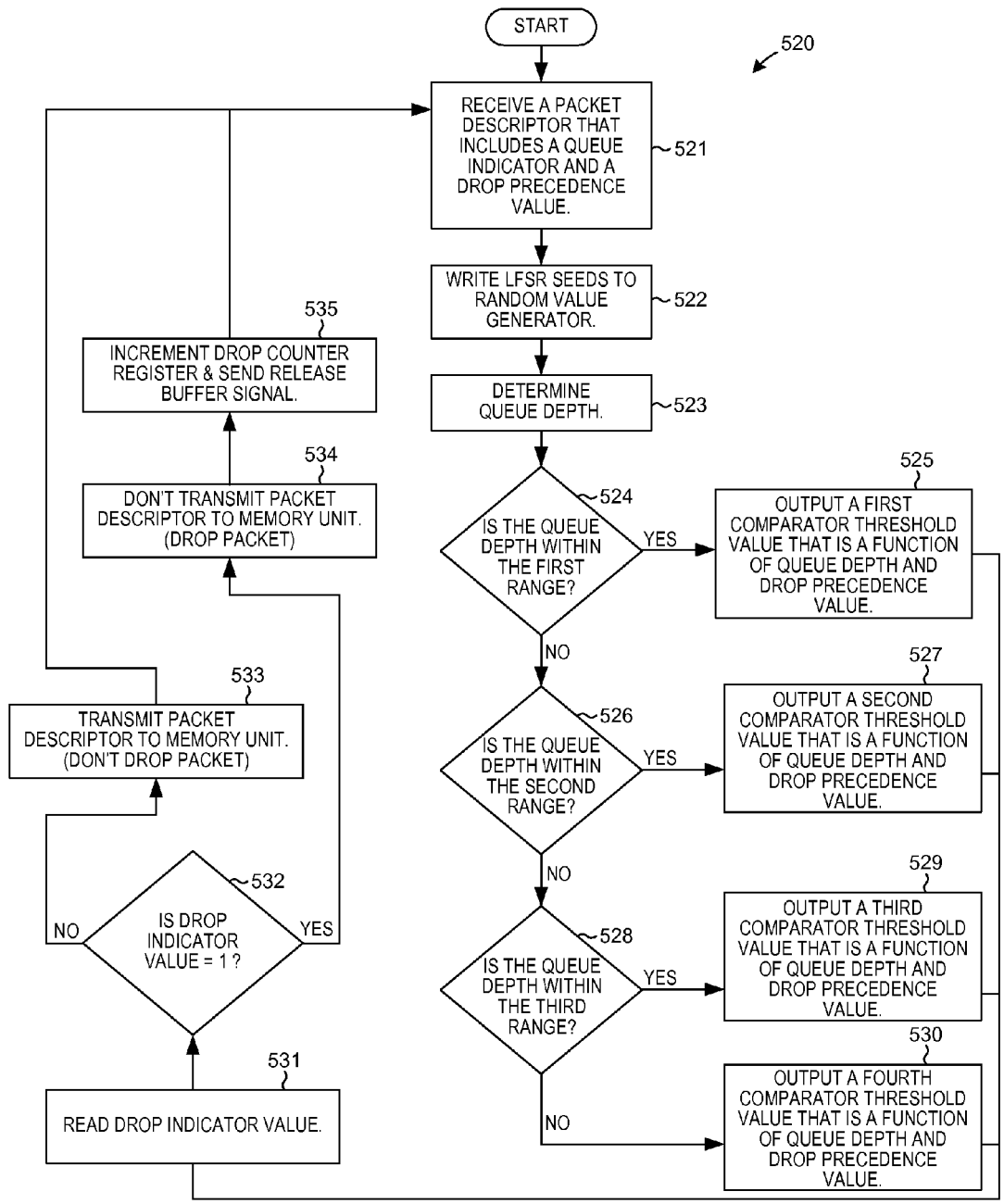
FIG. 24 is a diagram illustrating the operation 520 of the first example of Random Early Detection (RED) packet dropper with drop precedence 402.

FIG. 24 is a diagram illustrating the operation 520 of the first example of Random Early Detection (RED) packet dropper with drop precedence 402. In step 521 the RED packet dropper receives a packet descriptor that includes a queue indicator and a drop precedence value. In step 522, the LFSR sees are communicated to the random value generator. In step 523, the queue depth is determined. In step 524, it is determined if the queue depth is within a first queue depth range. If the queue depth is in the first queue depth range, the first queue depth range is concatenated with the drop precedence value to generate the comparator pointer. The comparator pointer is then used to read the comparator threshold value of "110" from the comparator threshold register 410 (step 525). If the queue depth is not within the first queue depth range, then the flow continues to step 526. In step 526, it is determined if the queue depth is within a second queue depth range. If the queue depth is in the second queue depth range, the second queue depth range is concatenated with the drop precedence value to generate the comparator pointer. The comparator pointer is then used to read the comparator threshold value of "100" from the comparator threshold register 410 (step 527). If the queue depth is not within the second queue depth range, then the flow continues to step 528. In step 528, it is determined if the queue depth is within a third queue depth range. If the queue depth is in the third queue depth range, the third queue depth range is concatenated with the drop precedence value to generate the comparator pointer. The comparator pointer is then used to read the comparator threshold value of "010" from comparator threshold register 410 (step 529). If the queue depth is not within the third queue depth range, the third queue depth range is concatenated with the drop precedence value to generate the comparator pointer. The comparator pointer is then used to read the comparator threshold value of "000" from comparator threshold register 410 (step 530). The drop indicator value based on the comparator threshold value and the random value is read in step 531. In step 532 it is determined if the drop indicator value is a logic high ("1") or a logic low ("0"). If the drop indicator is a logic high value then the packet descriptor is not stored in the queue within the memory unit in step 534 and the drop counter value is incremented and the release buffer signal is sent to the buffer storing the packet associated with the egress packet descriptor in step 535. If the drop indicator is a logic low value then the packet descriptor is stored in the queue within the memory unit in step 533.

Figure 25:
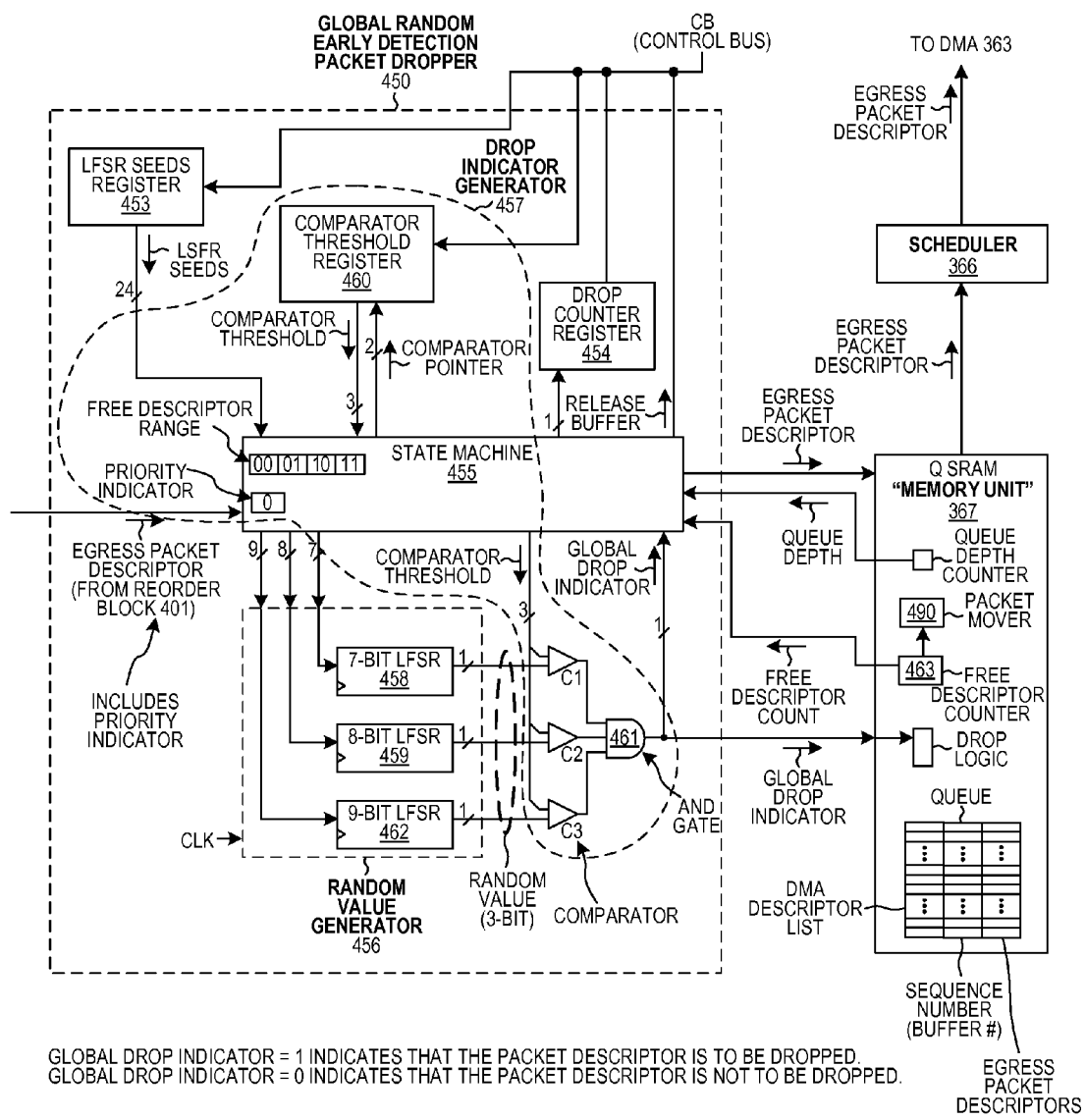
FIG. 25 is a diagram of a first example of a global Rand Early Detection (RED) packet dropper 450.

FIG. 25 is a diagram of global Random Early Detection (RED) packet dropper 450. Global RED packet dropper 450 is a first example of a global RED packet dropper. Global RED packet dropper 450 includes Linear Feedback Shift Register (LFSR) 453, drop count register 454, state machine 455, random value generator 456, and drop indicator generator 457. Random value generator 456 includes a seven-bit LFSR 458, eight-bit LFSR 459 and nine-bit LFSR 462. Drop indicator generator 457 includes comparator threshold register 460, comparators C1-C3, and AND gate 461. State machine 455 receives egress packet descriptors (packet descriptors). As discussed above in FIG. 8, egress packet descriptors include a queue number (also referred to as a "queue indicator") and a priority indicator that is associated with the queue. In another example, both the queue number and the priority indicator may be communicated to the RED packet dropper 450 independently from the egress packet descriptor. State machine 455 also receives a free descriptor range from a free descriptor counter 463 included in memory unit 367. Free descriptor counter 463 increments every time a egress packet descriptor is stored in the queue memory and decrements every time the egress packet descriptor is removed from the queue memory. The state machine 455 utilizes drop indicator generator 457 and random value generator 456 to determine if a packet descriptor is to be dropped or is to be transmitted. In the event it is determined that the packet descriptor is to be transmitted, the state machine 455 causes the packet descriptor to be stored in queue number indicated in the packet descriptor. Storing the packet descriptor in the queue will cause the packet descriptor to later be read from the queue within the memory unit 367 and communicated to scheduler 366. Upon receiving the packet descriptor, scheduler 366 will cause a packet associated with the packet descriptor to be transmitted. In the event it is determined that the packet descriptor is to be dropped, the state machine 455 causes the packet descriptor to not be stored in any queue. Not storing the packet descriptor in the queue will cause the packet associated with the packet descriptor to not be transmitted. When the packet descriptor is not stored in the queue the state machine 455 will also increment a value stored in the drop counter register 454 and send a release buffer signal to the buffer location storing the packet associated with the packet descriptor.

In operation, the state machine 455 receives the egress packet descriptor from reorder block 401. In response to receiving the egress packet descriptor, state machine 455 reads the LFSR seeds from LFSR seeds register 453 and communicates the LFSR seeds to random value generator 456. In one example, random value generator 456 includes three LFSRs 458, 459 and 462. These LFSRs are similar to the LFSRs illustrated in FIGS. 14-16, respectively. LFSR 458 is a seven-bit LFSR that is programmed with a seven-bit seed and outputs a single random bit. LFSR 459 is an eight-bit LFSR that is programmed with an eight-bit seed and outputs a single random bit. LFSR 462 is a nine-bit LFSR that is programmed with a nine-bit seed and outputs a single random bit. Each of the LFSR output bits are combined to create a random value (3-bits). Upon receiving the egress packet descriptor the state machine 455 also determines the free descriptor range of the queue memory and the priority level associated with the egress packet descriptor. In one example, the state machine 455 determines the free descriptor range by reading the free descriptor from free descriptor counter 463 within the memory unit 367. State machine 455 reads the free descriptor count and determines a free descriptor range in which the free descriptor count resides. The free descriptor ranges are defined by free descriptor threshold values. The free descriptor threshold values are stored in the global RED packet dropper (not shown in FIG. 17). In one example, the free descriptor threshold values can be programmed in a register across a command bus, such that the thresholds may be varied during operation. In another example, the free descriptor threshold values are hardcoded during manufacturing and do not vary during operation. The free descriptor count indicates the amount of free memory space in the queue memory. State machine 455 determines the priority level associated with the egress packet descriptor based on the priority indicator included egress packet descriptor. When the priority indicator is a first value, state machine 455 determines that a high priority level is associated with the egress packet descriptor. Alternatively, when the priority indicator is a second value, state machine 455 determines a low priority level is associated with the egress packet descriptor. In one example, when state machine 455 determines that a high priority level is associated with the egress packet descriptor the state machine 455 will automatically cause the egress packet descriptor to be communicated to the appropriate queue in memory unit 367 by setting the comparator threshold value to 000.

In another example, when the state machine 455 determines that a low priority level associated with the egress packet descriptor, state machine 455 determines the free descriptor range based on the free descriptor count and generates a comparator pointer. The comparator pointer is based on the free descriptor range. In one example the comparator pointer actually is the free descriptor range. In the present embodiment there are four descriptor ranges; however, one skilled in the art will quickly recognize that other embodiments utilizing more or fewer descriptor ranges is also taught in the present application. The comparator pointer is then used to select one of the eight comparator threshold values stored in comparator threshold register 460. The selected comparator threshold is then communicates to comparators C1-C3. In one example, the first bit of the comparator threshold is communicated to a first terminal of comparator C1 and the output of LFSR 415 is communicated to a second terminal of comparator C1, the second bit of the comparator threshold is communicated to a first terminal of comparator C2 and the output of LFSR 459 is communicated to a second terminal of comparator C2, and the third bit of the comparator threshold is communicated to a first terminal of comparator C3 and the output of LFSR 462 is communicated to a second terminal of comparator C3. The output of comparator C1 is a logic high ("1") only when the output of LFSR 458 is greater than the first bit of the comparator threshold. The output of comparator C2 is a logic high ("1") only when the output of LFSR 459 is greater than the second bit of the comparator threshold. The output of comparator C3 is a logic high ("1") only when the output of LFSR 462 is greater than the third bit of the comparator threshold. The output of each comparator (C1-C3) is ANDed together by AND gate for 61. The output of AND gate for 461 is a logic high ("1") only when all three input terminals of AND get for 461 are a logic high ("1"). The output of AND gate 461 is the drop indicator.

When the drop indicator is a logic high ("1"), the state machine 455 drops the packet descriptor (i.e. the packet descriptor is not stored in the queue within the memory unit 367) and the state machine 455 increments the drop counter value stored in the drop counter register by one and communicates a release buffer signal to the buffer that stores the packet associated with the packet descriptor. The release buffer signal is sent to the buffer storing the associated packet so to release the buffer for storage of another packet because the global RED packed dropper has determined that the packet is not to be transmitted.

When the drop indicator is a logic low ("0"), the state machine 455 causes the egress packet descriptor to be stored in the queue in the memory unit 367. The drop counter value stored in the drop counter register 454 is not incremented and a release buffer signal is not sent to the buffer storing the packet associated with the egress packet descriptor because the global RED packet dropper has determined that the packet is to be transmitted. The egress packet descriptor is then communicated from the queue in memory unit 367 to scheduler 366. Scheduler 366 then communicates the egress packet descriptor to DMA 363 which causes the packet associated with the egress packet descriptor to be transmitted.

Setting of the global RED packet dropper can be programmed by a processor across a command bus interface. For example, the LFSR seeds used by the random value generator 456 can be modified by writing new LFSR seeds into LFSR seeds register 453 across the control bus. The drop count value stored in the drop counter register can be cleared or read across the control bus by another processor on the control bus. Likewise, the comparator thresholds stored in the comparator threshold register 460 can be modified by writing new comparator thresholds into the comparator threshold register across the control bus. This programmability allows for adjustable operation of drop probabilities during operation.

Figure 26:
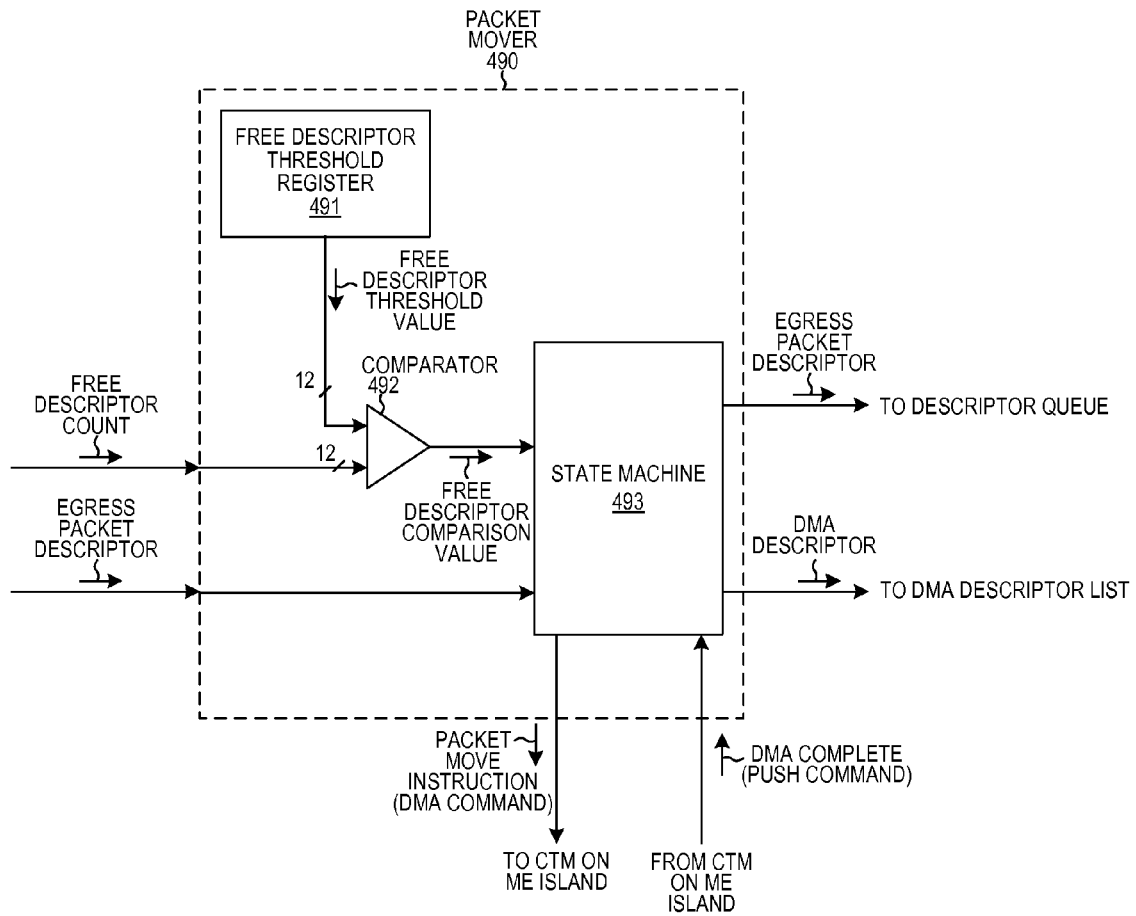
FIG. 26 is a diagram of packet mover circuit 490.

FIG. 26 is a diagram of packet mover circuit 490. In a first embodiment as shown in FIG. 25, the packet mover circuit 490 is included in memory unit 367. However, in a second embodiment the packet mover circuit 490 is included in scheduler 366, not in memory unit 367. Packet mover circuit 490 includes a free descriptor threshold register 491, a comparator circuit 492, and a state machine 493. In one example the free descriptor threshold register is programmed with one or more free descriptor threshold values. In the present embodiment a single free descriptor threshold value is programmed in the free descriptor threshold register.

Figure 27:
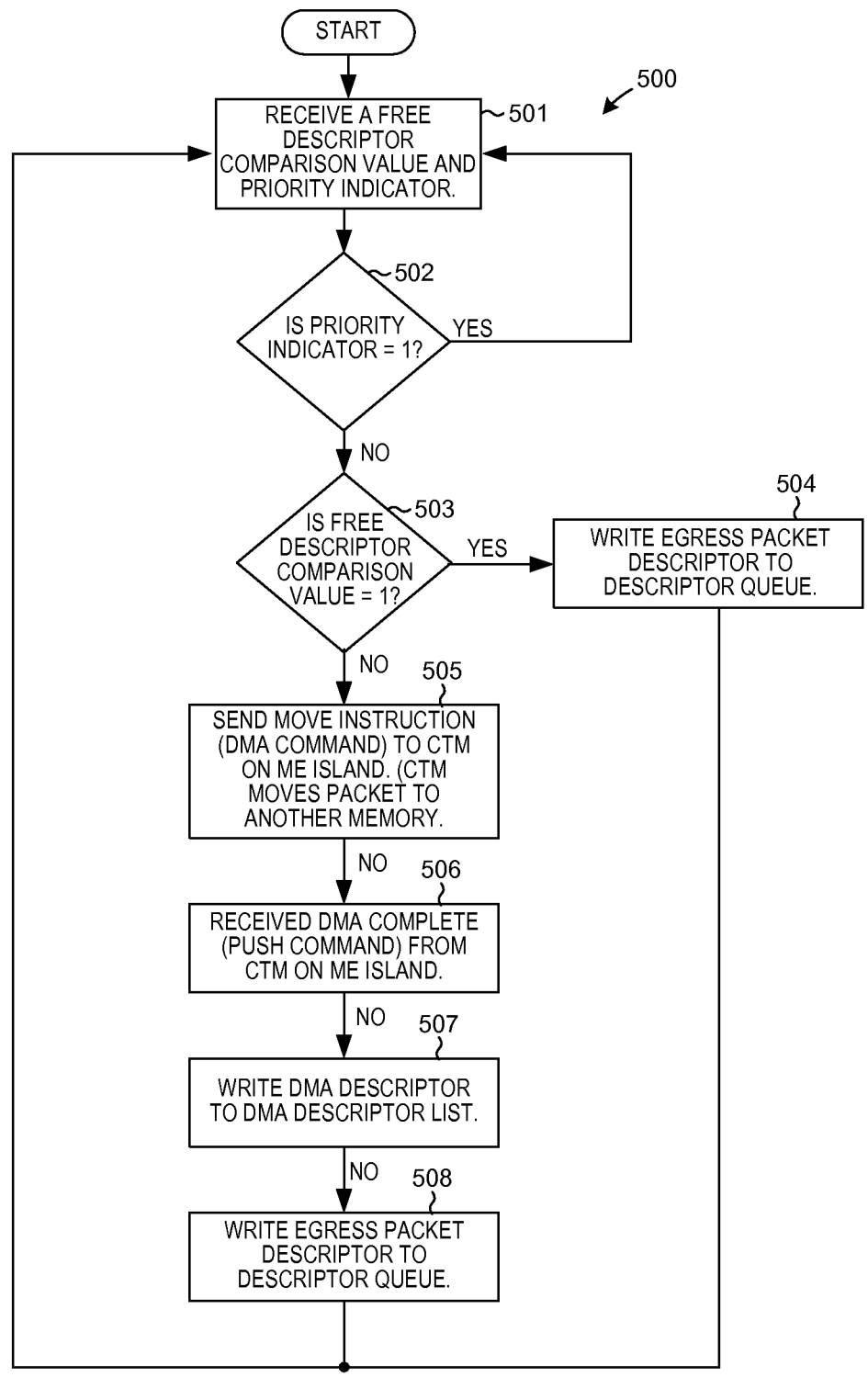
FIG. 27 is a state machine diagram 500 illustrating the operation of state machine 493 included in packet mover circuit 490.

A free descriptor threshold value is used to convert the free descriptor count to a free descriptor comparison value. In one example the free descriptor threshold value is a 12-bit value, the free descriptor count is a 12-bit value, and the free descriptor comparison value is a 1-bit value. The operation 500 of the packet mover state machine is illustrated in FIG. 27. In step 501 the packet mover state machine receives a free descriptor comparison value. In step 502, it is determined if the priority indicator is a logic high value. If the priority indicator is a logic high level then the packet associated with the egress packet descriptor is not dropped and the process terminates. If the priority indicator is a logic low level then the state machine continues to step 503. In step 503, the packet mover state machine determines that the free descriptor comparison value is equal to one. If the free descriptor comparison values equal to one, the packet mover state machine perform step 504 and writes the egress packet descriptor to the associated descriptor queue. In step 504 is causing the packet associated with the egress packet descriptor to be communicated because more than the free descriptor threshold value of queue memory is available. Alternatively, if it is determined that the free descriptor comparison value is equal to zero in step 503, then the packet mover state machine sends a move instruction to the Cluster Target Memory (CTM) on the ME island. The CTM on the ME island is where the packet associated with the egress packet descriptor is stored. In response to receiving the move instruction the CTM moves the packet to the memory location indicated in the send move instruction. The send move instruction is communicated across the CPP bus. Once the packet has been moved, the packet mover state machine receives a DMA complete command from the CTM in step 506. In step 507 the packet mover state machine writes a DMA descriptor to the DMA descriptor list. The DMA descriptor contains information regarding where the packet is now stored. After updating the DMA descriptor list, the packet mover state machine writes the egress packet descriptor to the descriptor to in step 508.

Figure 28:
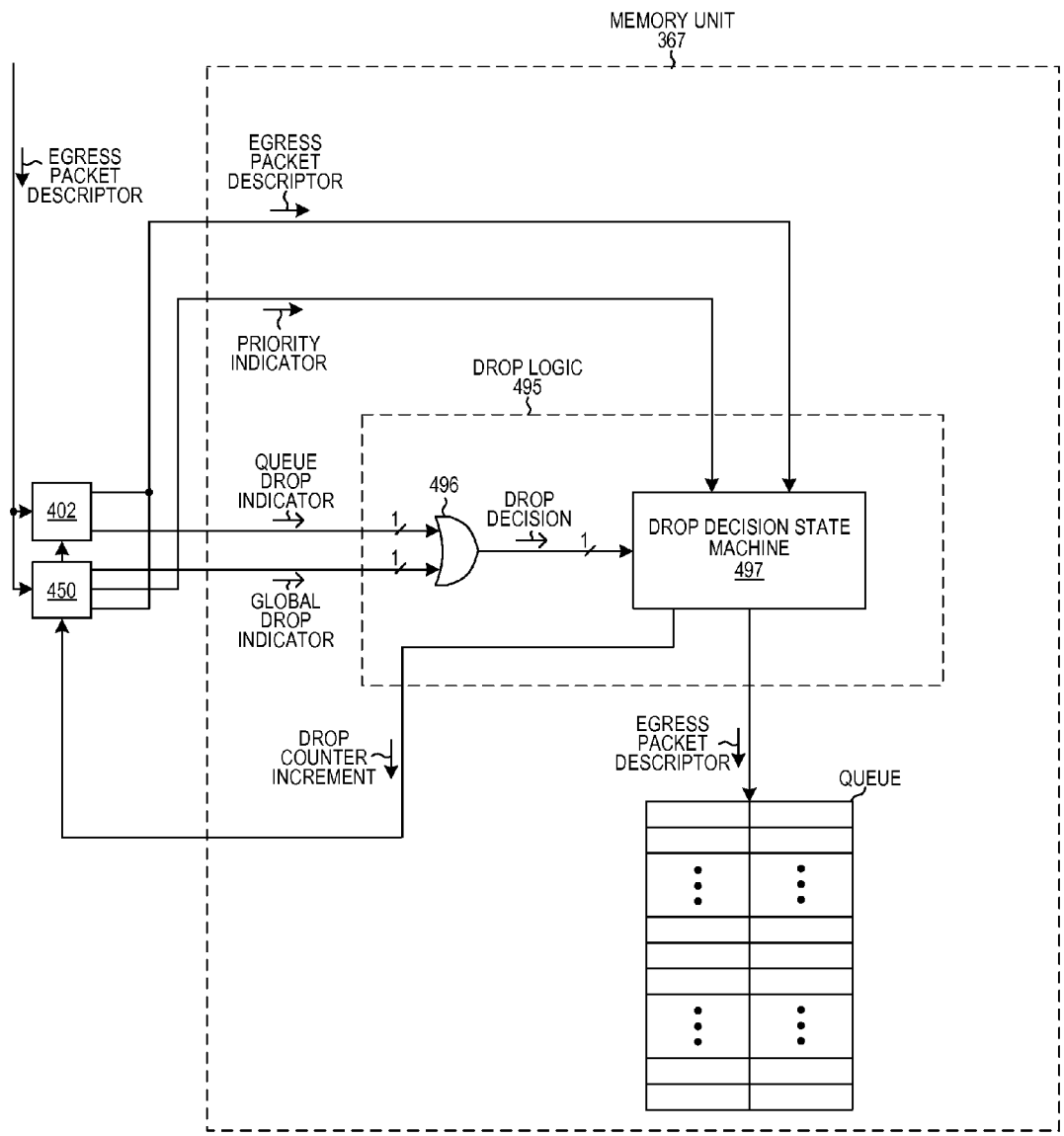
FIG. 28 is a diagram of drop logic circuit 495 included in memory unit 367.
Figure 29:
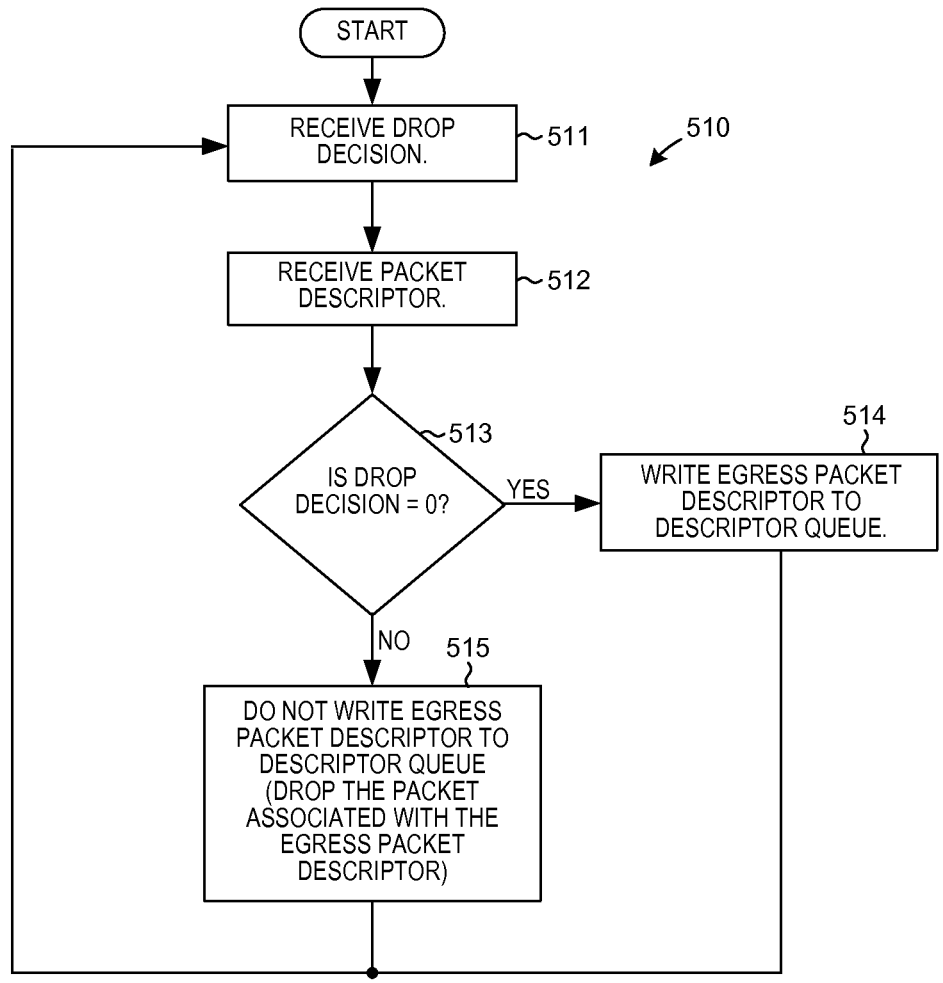
FIG. 29 is a state machine diagram 510 illustrating the operation of state machine 497 included in drop logic circuit 495.

FIG. 28 is a diagram of a drop logic circuit. The drop logic circuit 495 includes and/or circuit 496 and a drop decision state machine 497. The drop logic circuit 495 receives a drop indicator from RED packet dropper with drop precedence 402 and receives global drop indicator from global RED packet dropper 450. The drop logic circuit 495 also receives the egress packet descriptor and the priority indicator. The drop indicator is ORed with the global drop indicator to generate a drop decision. In one example the drop indicator is a 1-bit value, the global drop indicator is a 1-bit value, and the drop decision is a 1-bit value. Whenever the priority indicator is a logic high value (indicating that the packet associated with the packet descriptor is a high priority packet) the drop logic circuit 495 outputs the egress packet descriptor to the queue. Alternatively, when the priority indicator is a logic low value (indicating that the packet associated with the egress packet descriptor is a low priority packet) and the drop decision is a logic high value then the drop decision state machine does not write the egress packet descriptor to the queue associated with the egress packet descriptor. When the drop decision is a logic low value then the drop decision state machine writes the egress packet descriptor to the queue associated with the egress packet descriptor regardless of the priority indicator value. The operation 510 of the drop logic state machine is illustrated in FIG. 29. In step 511, the drop decision is received. In step 512 packet descriptor is received. In step 513 the drop logic state machine determines if the drop decision is a logic low value. If the drop decision is a logic low value the drop logic state machine writes the egress packet descriptor to the queue associated with the egress packet descriptor (step 514), thereby causing the packet associated with the egress packet descriptor to be transmitted. If the drop decision is a logic high value the drop logic state machine does not write the egress packet descriptor to the queue, thereby dropping the packet associated with the egress packet descriptor (step 515). In one example, step 515 further includes sending a free packet command to the Cluster Target Memory (CTM) that stores the packet associated with the egress packet descriptor to release a buffer in the CTM that was used to store the packet.

Figure 30:
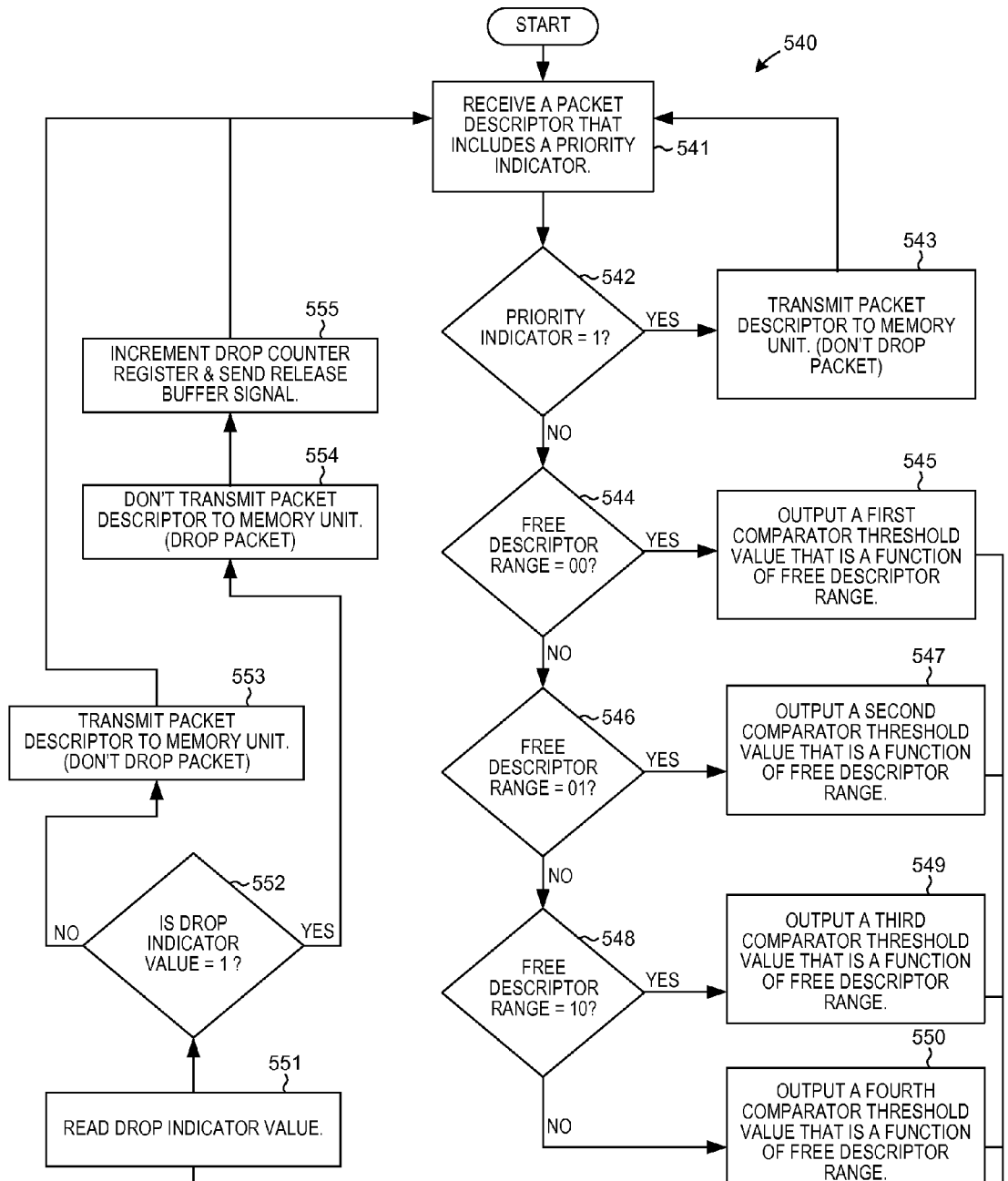
FIG. 30 is a diagram illustrating the operation 540 of the first example of global RED packet dropper 450.

FIG. 30 is a flowchart diagram illustrating the operation 540 of the global RED packet dropper. In step 541, the global RED packet dropper receives an egress packet descriptor that includes a priority indicator. In step 542, it is determined if the priority indicator is a logic high value. If the priority indicator is a logic high value the egress packet descriptor is written to a queue associated with the egress packet descriptor within the memory unit 367 (step 543). In step 543 the packet associated with the egress packet descriptor is transmitted and known packet dropping occurs.

If the priority indicator is a logic low value it is determined if the free descriptor count is within a first free descriptor range (00). If the free descriptor count is within the first range, a first comparator threshold value is output to comparators C1, C2 and C3 within the drop indicator generator 457 (step 545). The first comparator threshold value is a function of the free descriptor range and determines the probability of the packet being dropped.

If the free descriptor count is not within the first free descriptor range, it is determined if the free descriptor count is within a second free descriptor range (01). If the free descriptor count is within the second free descriptor range a second comparator threshold value is output to comparators C1, C2, and C3 within the drop indicator generator 457 (step 547). The second comparator threshold value is a function of the free descriptor range and determines the probability of the packet being dropped.

If the free descriptor count is not within the second free descriptor range, it is determined if the free descriptor count is within a third free descriptor range (10). If the free descriptor count is within the third free descriptor range a third comparator threshold value is output to comparators C1, C2, and C3 within the drop indicator generator 457 (step 549). The third comparator threshold value is a function of the free descriptor range and determines the probability of the packet being dropped.

It is free descriptor count is not within the third free descriptor range (11), A4 comparator threshold value is output to comparators C1, C2, and C3 within the drop indicator generator 457 (step 550). In step 551, the drop indicator value generated by the drop indicator generator 457 is read. In step 552 is determined if the drop indicator is a logic high value. If the drop indicator is a logic high value the egress packet descriptor is not written to the queue in memory associated with the egress packet descriptor in the memory unit 367 (554), and the drop counter register is incremented and a release buffer signal is sent to the memory location where the packet associated with the egress packet descriptor is stored so that the packet memory space can be freed (step 555). Alternatively, if the drop indicator is a logic low value the egress packet descriptor is written to the queue associated with the egress packet descriptor within the memory unit 367 (step 553) and the packet associated with the egress packet descriptors transmitted (not dropped).

Figure 31:
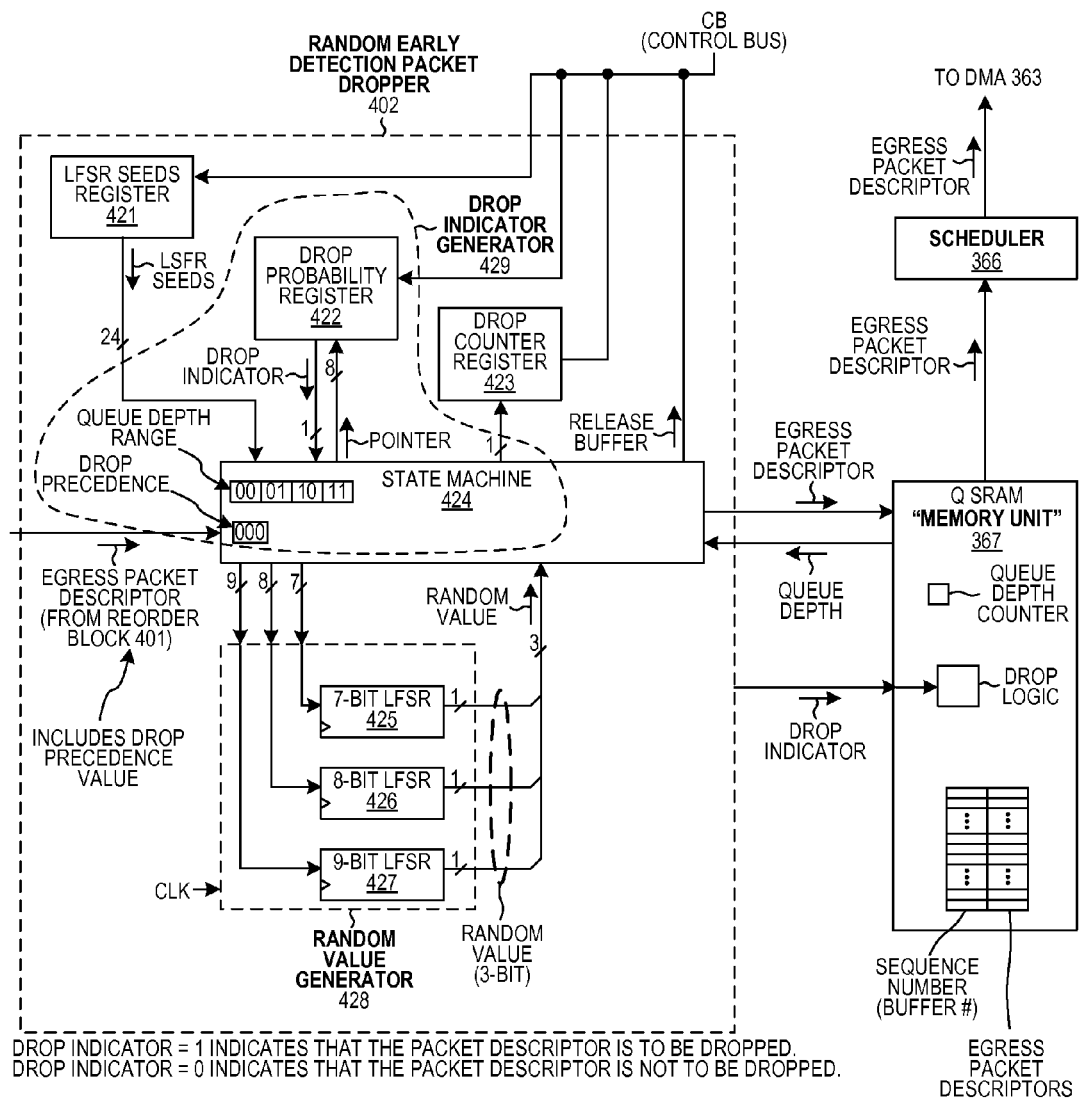
FIG. 31 is a diagram of a second example of Random Early Detection (RED) packet dropper with drop precedence 402.

FIG. 31 is a diagram of a second embodiment of Random Early Detection (RED) packet dropper with drop precedence 402. RED packet dropper with drop precedence 402 is a second example of RED packet dropper with drop precedence. RED packet dropper with drop precedence 402 includes Linear Feedback Shift Register (LFSR) 421, drop count register 423, state machine 424, random value generator 428, and drop indicator generator 429. Random value generator 428 includes a seven-bit LFSR 425, eight-bit LFSR 426 and nine-bit LFSR 427. Drop indicator generator 429 includes drop probability register 422. State machine 424 receives egress packet descriptors (packet descriptors). As discussed above in FIG. 8, egress packet descriptors include a queue number (also referred to as "queue indicators"). In another example, the queue number may be communicated to the RED packet dropper 402 independently from the egress packet descriptor. The state machine 424 utilizes drop indicator generator 429 and random value generator 428 to determine if a packet descriptor is to be dropped or is to be transmitted. In the event it is determined that the packet descriptor is to be transmitted, the state machine 424 causes the packet descriptor to be stored in queue number indicated in the packet descriptor. Storing the packet descriptor in the queue will cause the packet descriptor to later be read from the queue within the memory unit 367 and communicated to scheduler 366. Upon receiving the packet descriptor, scheduler 366 will cause a packet associated with the packet descriptor to be transmitted. In the event it is determined that the packet descriptor is to be dropped, the state machine 424 causes the packet descriptor to not be stored in any queue. Not storing the packet descriptor in the queue will cause the packet associated with the packet descriptor to not be transmitted. When the packet descriptor is not stored in the queue the state machine 424 will also increment a value stored in the drop counter register 423 and send a release buffer signal to the buffer location storing the packet associated with the packet descriptor.

In operation, the state machine 424 receives the egress packet descriptor from reorder block 401. In response to receiving the egress packet descriptor, state machine 424 reads the LFSR seeds from LFSR seeds register 421 and communicates the LFSR seeds to random value generator 428. In one example, random value generator 428 includes three LFSRs 425 to 427. These LFSRs are similar to LFSRs 408, 409 and 420 illustrated in greater detail in FIGS. 14-16, respectively. LFSR 425 is a seven-bit LFSR that is programmed with a seven-bit seed and outputs a single random bit. LFSR 426 is an eight-bit LFSR that is programmed with an eight-bit seed and outputs a single random bit. LFSR 427 is a nine-bit LFSR that is programmed with a nine-bit seed and outputs a single random bit. Each of the LFSR output bits are combined to create a random value (3-bits). Upon receiving the egress packet descriptor the state machine 424 also determines the instantaneous queue depth of the queue indicated in the egress packet descriptor. In one example, the state machine 424 determines the instantaneous queue depth by reading the contents of a queue depth register within the memory unit 367. The instantaneous queue depth (i.e. how many packet descriptors are stored in the queue) is kept track incrementing the queue depth value stored in the queue depth register when a new packet descriptor is written to the queue and decrementing the queue depth value stored in the queue depth register when a packet descriptor is read from the queue. It is noted that the instantaneous queue depth is not the same as measuring an average queue depth. The instantaneous queue depth is the depth of the queue at the time the egress packet descriptor is received and does not depend on the depth of the queue at any time before the egress packet descriptor was received.

Figure 32:
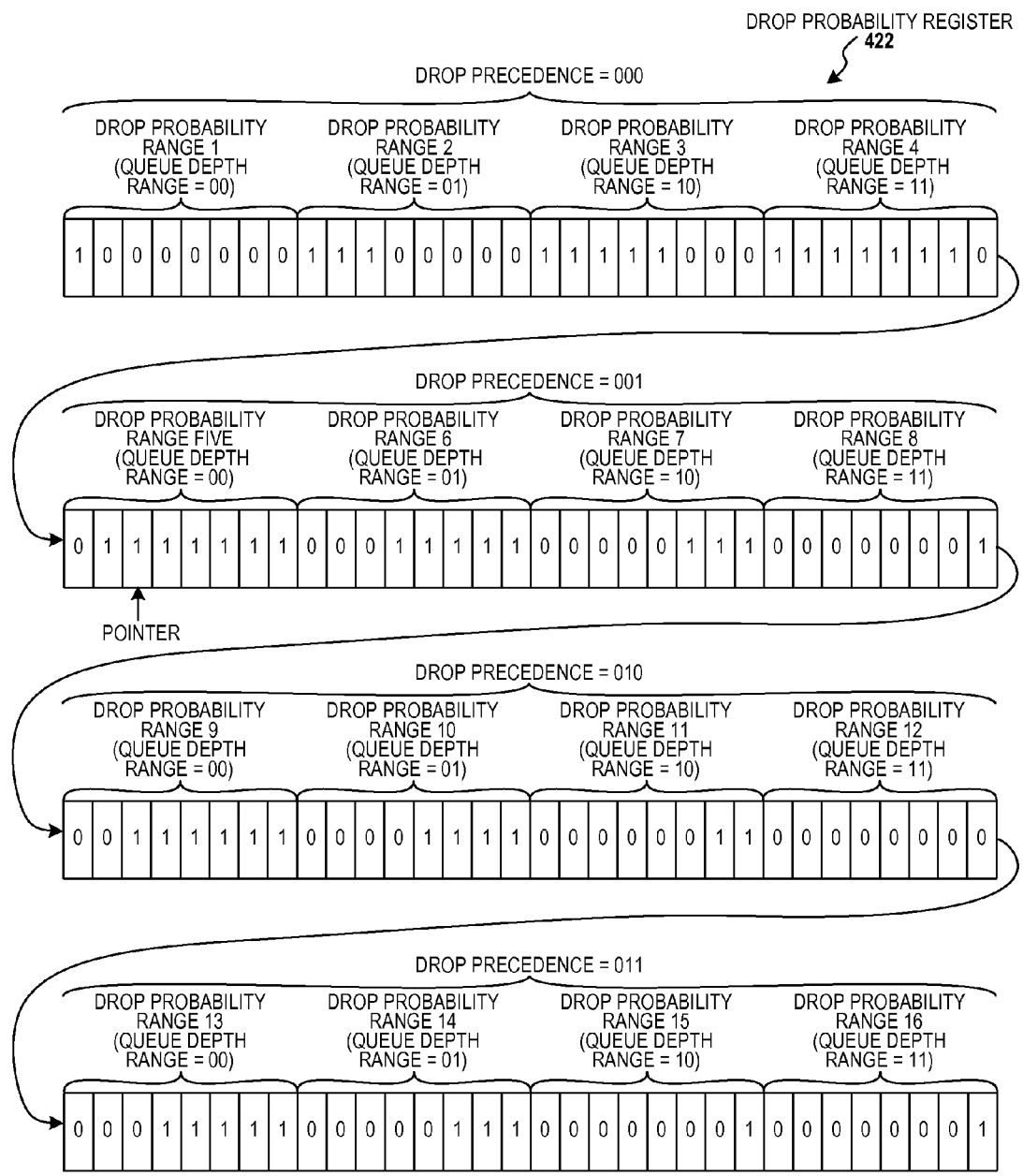
FIG. 32 is a diagram illustrating the contents of drop probability register 422.

The contents of drop probability register 422 are illustrated in FIG. 32. The drop probability register includes two hundred and fifty six single bit drop indicator values divided into the drop precedence, each drop precedence including four drop probability ranges (one for each queue depth range). Each drop probability range includes eight drop indicators. Only four of eight drop precedence values including one hundred and twenty-eight drop indicators are illustrated in FIG. 26. A specific number of set drop indicators are set to a logic high to achieve a desired drop probability for a drop probability range. For example, the desired drop probability range 1 is ⅛, therefore one of the eight drop indicators stored in drop probability range 1 is set to a logic high and all other drop indicators are set to a logic low. The desired drop probability range 2 is ⅜, therefore three of the eight drop indicators stored in drop probability range 2 is set to a logic high and all other drop indicators are set to a logic low. The desired drop probability range 3 is ⅝, therefore five of the eight drop indicators stored in drop probability range 3 is set to a logic high and all other drop indicators are set to a logic low. The desired drop probability range is ⅞, therefore seven of the eight drop indicators stored in drop probability range 4 is set to a logic high and the other drop indicator is set to a logic low.

Once the queue depth is determined, the state machine 424 determines in which of four queue depth ranges (1-4) the queue depth is within. The queue depth range is then combined with the drop precedence value and the random value to generate a pointer. FIGS. 33-36 illustrate one example as to how the queue depth range, the drop precedence value, and the random value can be combined to generate the pointer. The pointer points to a drop indicator within the drop probability register 422. The probability that the pointer points to a logic high drop indicator is based on the drop probability programmed in the drop probability register for the given combination of queue depth range and drop precedence value.

When the drop indicator is a logic high ("1"), the state machine 424 drops the packet descriptor (i.e. the packet descriptor is not stored in the queue within the memory unit 367). Rather, the state machine 424 increments the drop counter value stored in the drop counter register by one and communicates a release buffer signal to the buffer that stores the packet associated with the packet descriptor. The release buffer signal is sent to the buffer storing the associated packet so to release the buffer for storage of another packet because the RED packed dropper has determined that the packet is not to be transmitted.

When the drop indicator is a logic low ("0"), the state machine 424 causes the egress packet descriptor to be stored in the queue in the memory unit 367. The drop counter value stored in the drop counter register 423 is not incremented and a release buffer signal is not sent to the buffer storing the packet associated with the egress packet descriptor because the RED packet dropper has determined that the packet is to be transmitted. The egress packet descriptor is then communicated from the queue in memory unit 367 to scheduler 366. Scheduler 366 then communicates the egress packet descriptor to DMA 363 which causes the packet associated with the egress packet descriptor to be transmitted.

Setting of the RED packet dropper can be programmed by a processor across a command bus interface. For example, the LFSR seeds used by the random value generator 428 can be modified by writing new LFSR seeds into LFSR seeds register 421 across the control bus. The drop count value stored in the drop counter register can be cleared or read across the control bus by another processor on the control bus. Likewise, the drop indicators stored in the drop probability register 422 can be modified by writing drop indicators into the drop probability register across the control bus.

Figure 37:
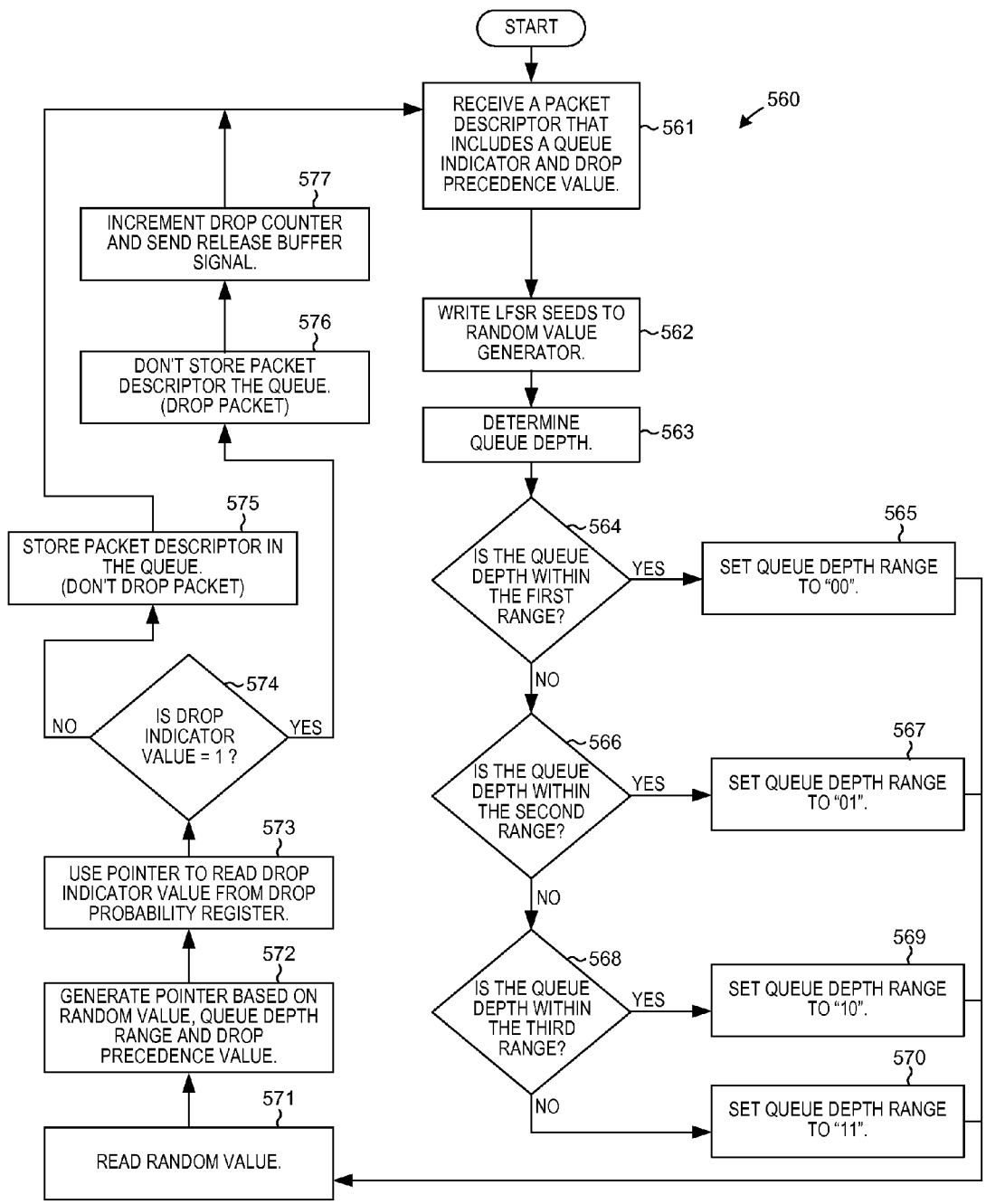
FIG. 37 is a diagram illustrating the operation 560 of the second example of Random Early Detection (RED) packet dropper with drop precedence 402.

FIG. 37 is a diagram illustrating the operation 560 of the second embodiment of Random Early Detection (RED) packet dropper 402. In step 561 the RED packet dropper receives a packet descriptor that includes a queue indicator and a drop precedence value. In step 562, the LFSR sees are communicated to the random value generator. In step 563, the queue depth is determined. In step 564, it is determined if the queue depth is within a first queue depth range. If the queue depth is in the first queue depth range, then the queue depth range is set to "00" in step 565. If the queue depth is not within the first queue depth range, then the flow continues to step 566. In step 566, it is determined if the queue depth is within a second queue depth range. If the queue depth is in the second queue depth range, then queue depth range is set to "01" in step 567. If the queue depth is not within the second queue depth range, then the flow continues to step 568. In step 568, it is determined if the queue depth is within a third queue depth range. If the queue depth is in the third queue depth range, then the queue depth range is set to "10" in step 569. If the queue depth is not within the third queue depth range, then the queue depth range is set to "11" step 570. In step 571 the random value is read. In step 572 the pointer is generated by combining the random value, the drop precedence value, and the queue depth range. In step 573, the pointer is used to read a drop indicator from the drop probability register. In step 574 it is determined if the drop indicator value is a logic high ("1") or a logic low ("0"). If the drop indicator is a logic high value then the packet descriptor is not stored in the queue within the memory unit in step 576 and the drop counter value is incremented and the release buffer signal is sent to the buffer storing the packet associated with the egress packet descriptor in step 577. If the drop indicator is a logic low value then the packet descriptor is stored in the queue within the memory unit in step 575.

Figure 38:
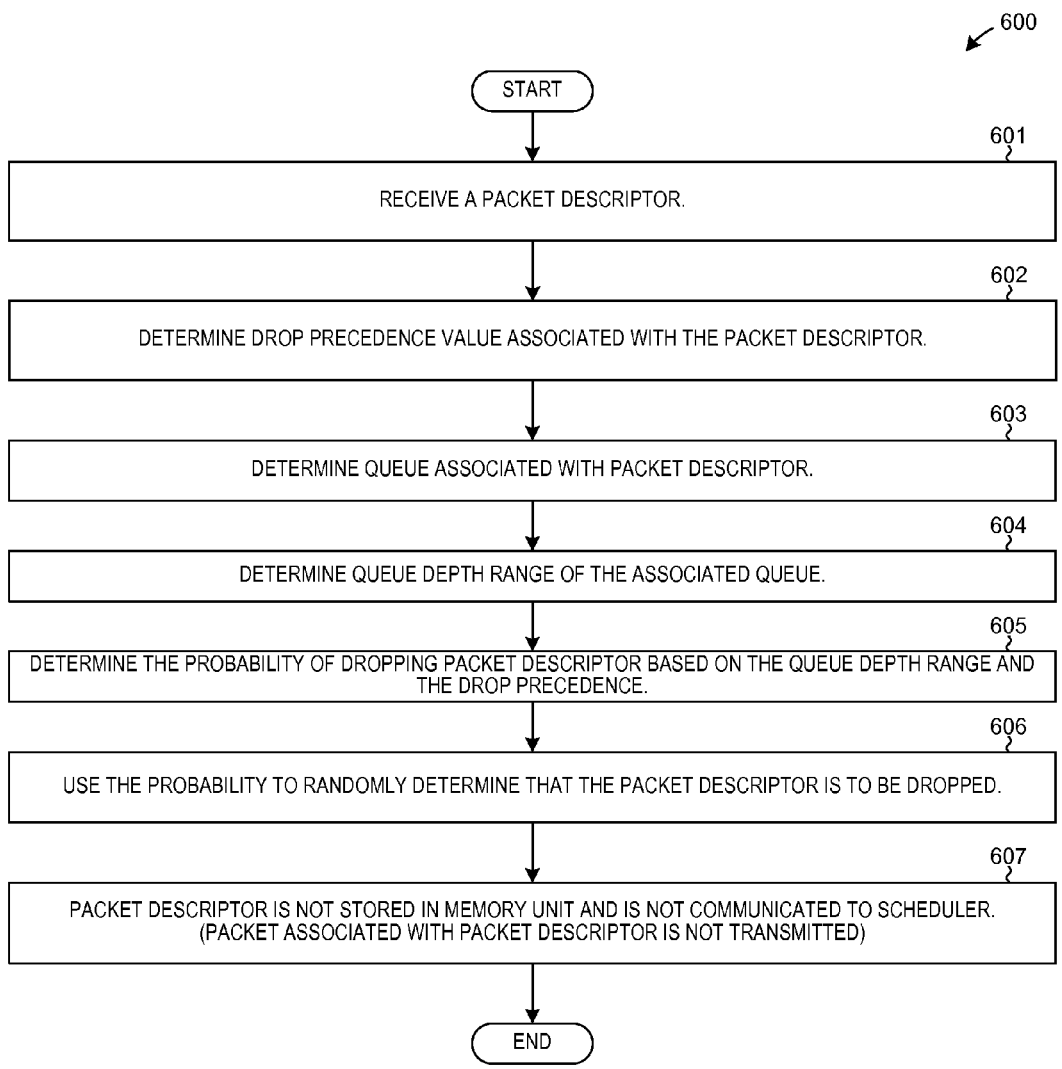
FIG. 38 is a flowchart 600 illustrating a first method of operation of a Random Early Detection (RED) packet dropper with drop precedence.

FIG. 38 is a flowchart 600 illustrating the method of operation of a Random Early Detection (RED) packet dropper with drop precedence. In step 601, a packet descriptor is received. In step 602, a drop precedence value associated with the packet is determined. In step 603, a queue associated with the packet descriptor is determined. In step 604, a queue depth range of the associated queue is determined. In step 605, the probability of dropping the packet descriptor is determined based on the queue depth range and the drop precedence value. In step 606, the probability determined in step 605 is used to randomly determine that the packet descriptor is to be dropped. In step 607, the packet descriptor is not stored in the associated queue within the memory unit and is not communicated to the scheduler causing the packet associated with the packet descriptor to not be transmitted.

Figure 39:
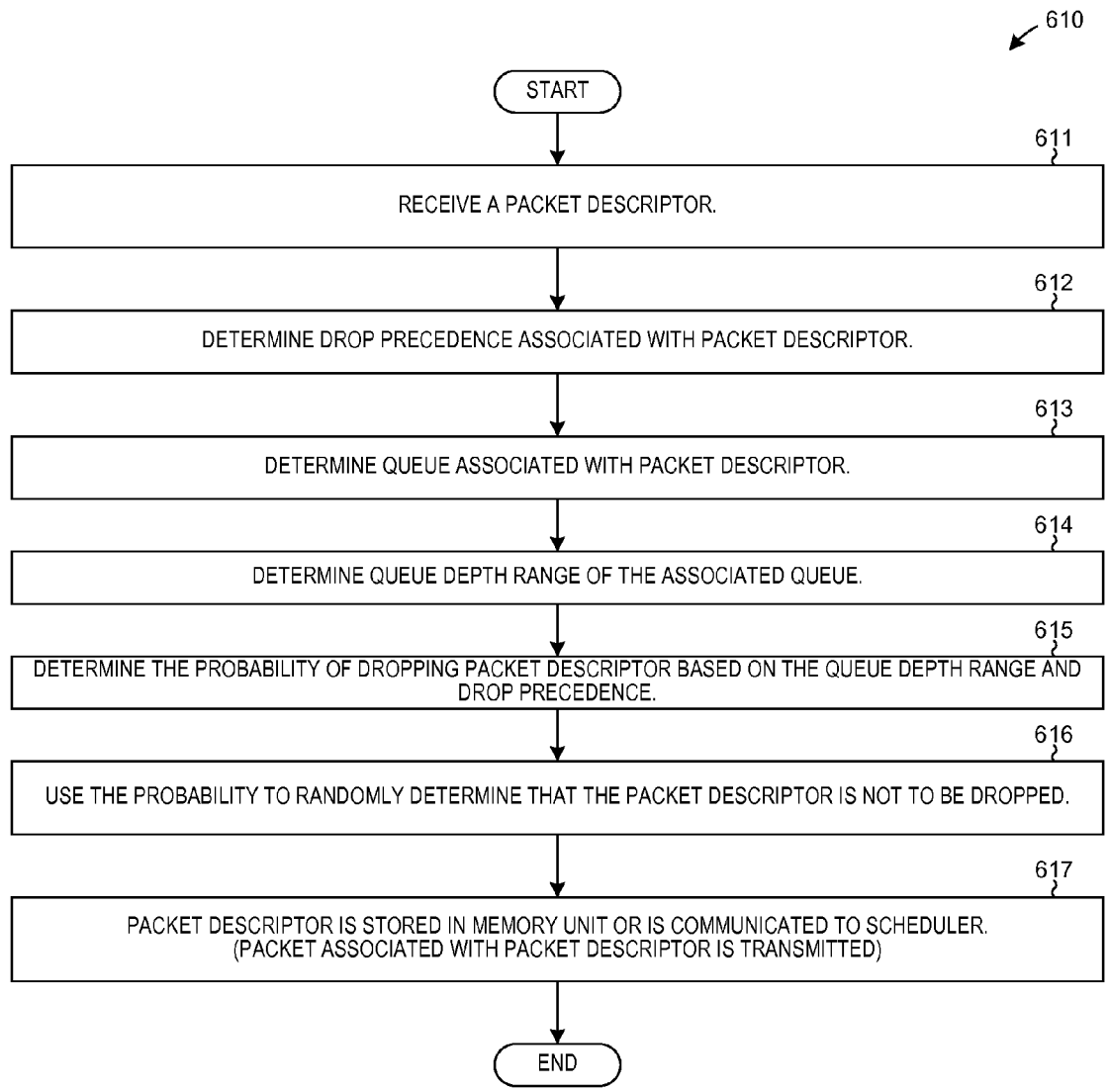
FIG. 39 is a flowchart 610 illustrating a second method of operation of a Random Early Detection (RED) packet dropper with drop precedence.

FIG. 39 is a flowchart 610 illustrating the method of operation of a Random Early Detection (RED) packet dropper. In step 611, a packet descriptor is received. In step 612, a drop precedence value associated with the packet descriptor is determined. In step 613, a queue associated with the packet descriptor is determined. In step 614, a queue depth range of the associated queue is determined. In step 615, the probability of dropping the packet descriptor is determined based on the queue depth range and the drop precedence value. In step 616, the probability determined in step 615 is used to randomly determine that the packet descriptor is not to be dropped. In step 617, the packet descriptor is stored in the associated queue within the memory unit and is communicated to the scheduler causing the packet associated with the packet descriptor to be transmitted.

Instantaneous Random Early Detection (RED) packet dropping with drop precedence provides a more efficient method of packet dropping over other methods of packet dropping. Instantaneous RED packet dropping with drop precedence does not require storing multiple queue depth values over time. Moreover, instantaneous RED packet dropping with drop precedence does not require processing a plurality of queue depth values to generate an average queue depth value. Further, the additional drop precedence capability allows different drop probabilities to be applied to the same instantaneous queue depth ranges in various queues. This last feature is of special importance in that one queue may be assigned to handle packets of high priority and another queue may be assigned to handle packets of the low primary. In this situation it is advantageous to apply different drop probabilities to the same queue depths in each queue. For example it may be advantageous to apply very low drop probability to a first queue depth range of a queue that is handling maintenance packets, while applying a higher drop probability to a first queue depth range of a queue that is handling TCP packets. These improvements provide enhanced bandwidth allocation management in network flow processors.

Figure 40:
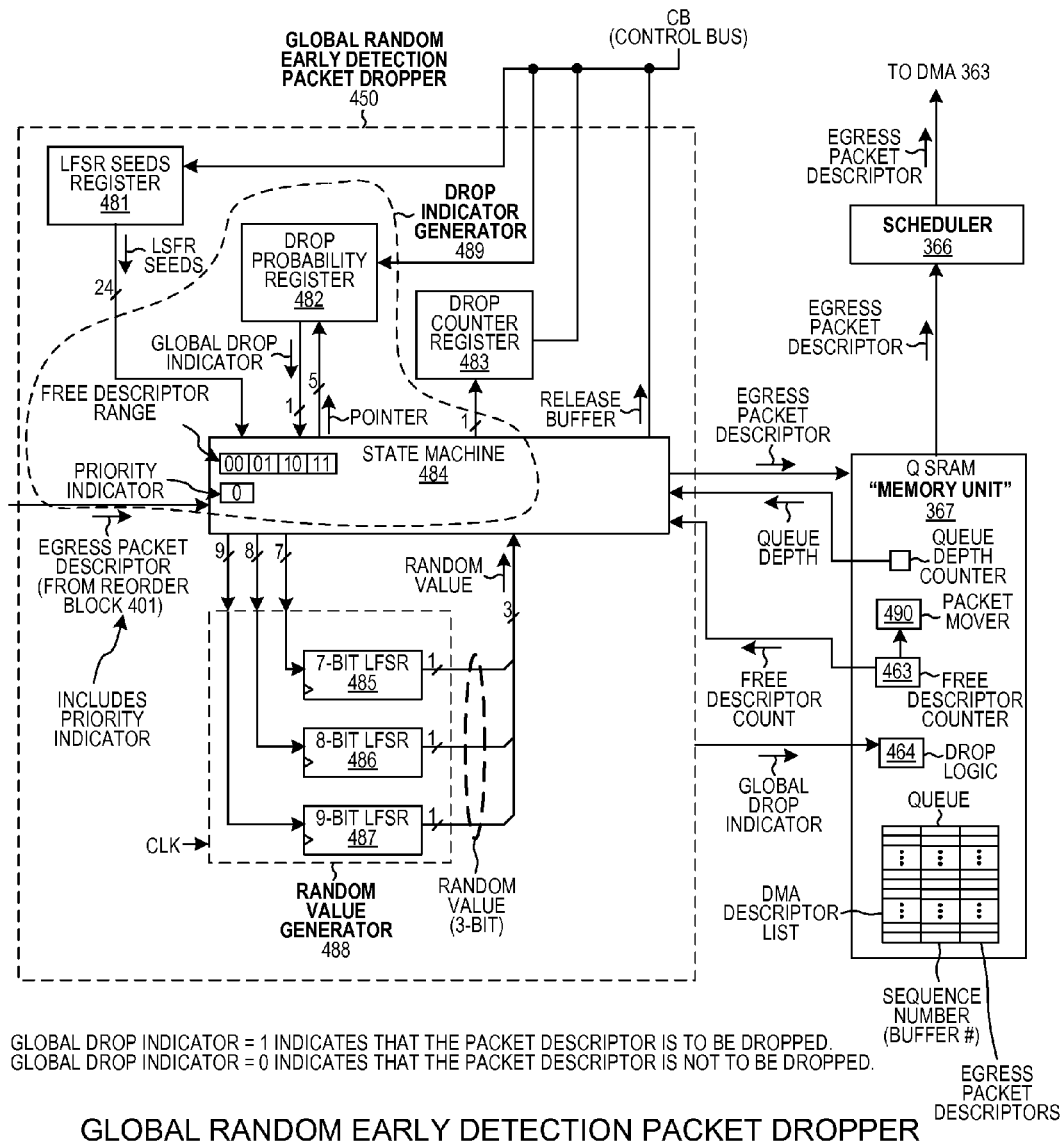
FIG. 40 is a diagram of a second example of global RED packet dropper 450.

FIG. 40 is a diagram of a second embodiment of a global RED packet dropper 540. In the second embodiment, global RED packet dropper 450 includes Linear Feedback Shift Register (LFSR) 481, drop count register 483, state machine 484, random value generator 488, and drop indicator generator 489. Random value generator 488 includes a seven-bit LFSR 485, eight-bit LFSR 486 and nine-bit LFSR 487. Drop indicator generator 489 includes a drop probability register 482, and state machine 484. State machine 484 receives egress packet descriptors (packet descriptors). As discussed above in FIG. 8, egress packet descriptors include a queue number (also referred to as a "queue indicator") and a priority indicator that is associated with the queue. In another example, both the queue number and the priority indicator may be communicated to the RED packet dropper 450 independently from the egress packet descriptor. State machine 484 also receives a free descriptor count from a free descriptor counter 463 included in memory unit 367. Free descriptor counter 463 increments every time a egress packet descriptor is stored in the queue memory and decrements every time the egress packet descriptor is removed from the queue memory. The state machine 455 utilizes drop indicator generator 489 and random value generator 488 to determine if a packet descriptor is to be dropped or is to be transmitted. In the event it is determined that the packet descriptor is to be transmitted, the state machine 484 causes the packet descriptor to be stored in queue number indicated in the packet descriptor. Storing the packet descriptor in the queue will cause the packet descriptor to later be read from the queue within the memory unit 367 and communicated to scheduler 366. Upon receiving the packet descriptor, scheduler 366 will cause a packet associated with the packet descriptor to be transmitted. In the event it is determined that the packet descriptor is to be dropped, the state machine 484 causes the packet descriptor to not be stored in any queue. Not storing the packet descriptor in the queue will cause the packet associated with the packet descriptor to not be transmitted. When the packet descriptor is not stored in the queue the state machine 484 will also increment a value stored in the drop counter register 43 and send a release buffer signal to the buffer location storing the packet associated with the packet descriptor.

In operation, the state machine 483 receives the egress packet descriptor from reorder block 401. In response to receiving the egress packet descriptor, state machine 44 reads the LFSR seeds from LFSR seeds register 481 and communicates the LFSR seeds to random value generator 488. In one example, random value generator 488 includes three LFSRs 485, 486 and 487. These LFSRs are similar to the LFSRs illustrated in FIGS. 14-16, respectively. LFSR 485 is a seven-bit LFSR that is programmed with a seven-bit seed and outputs a single random bit. LFSR 486 is an eight-bit LFSR that is programmed with an eight-bit seed and outputs a single random bit. LFSR 487 is a nine-bit LFSR that is programmed with a nine-bit seed and outputs a single random bit. Each of the LFSR output bits are combined to create a random value (3-bits). Upon receiving the egress packet descriptor the state machine 484 also determines the free descriptor range of the queue memory and the priority level associated with the egress packet descriptor. In one example, the state machine 484 determines the free descriptor range by reading the free descriptor from free descriptor counter 463 within the memory unit 367. State machine 484 reads the free descriptor count and determines a free descriptor range in which the free descriptor count resides. The free descriptor ranges are defined by free descriptor threshold values. The free descriptor threshold values are stored in the global RED packet dropper (not shown in FIG. 40). In one example, the free descriptor threshold values can be programmed in a register across a command bus, such that the thresholds may be varied during operation. In another example, the free descriptor threshold values are hardcoded during manufacturing and do not vary during operation. The free descriptor count indicates the amount of free memory space in the queue memory. State machine 484 determines the priority level associated with the egress packet descriptor based on the priority indicator included egress packet descriptor. When the priority indicator is a first value, state machine 484 determines that a high priority level is associated with the egress packet descriptor. Alternatively, when the priority indicator is a second value, state machine 484 determines a low priority level is associated with the egress packet descriptor. In one example, when state machine 484 determines that a high priority level is associated with the egress packet descriptor the state machine 484 will automatically cause the egress packet descriptor to be communicated to the appropriate queue in memory unit 367 by setting the global drop indicator to a logic low value (0).

In another example, when the state machine 484 determines that a low priority level associated with the egress packet descriptor, state machine 484 determines the free descriptor range based on the free descriptor count and generates a pointer. The comparator pointer is the concatenation of the free descriptor range (2-bits) and the random value (3-bits). In the present embodiment the pointer is a 5-bit value. In the present embodiment there are four descriptor ranges; however, one skilled in the art will quickly recognize that other embodiments utilizing more or fewer descriptor ranges is also taught in the present application. The pointer is then used to read one global drop indicator stored in drop probability register 482. The global drop indicator is then communicated to the drop logic circuit 464 included in the memory unit 367. The global drop indicator stored in drop probability register 482 can be programmed across the control bus. In one embodiment the global drop indicators stored in drop probability register 482 can be updated on the fly during the operation of the network flow processor. In another embodiment the global drop indicators stored in drop probability register 480 are programmed once during boot-up and remain constant during operation.

When the drop indicator is a logic high ("1"), the state machine 484 drops the packet descriptor (i.e. the packet descriptor is not stored in the queue within the memory unit 367) and the state machine 484 increments the drop counter value stored in the drop counter register by one and communicates a release buffer signal to the buffer that stores the packet associated with the packet descriptor. The release buffer signal is sent to the buffer storing the associated packet so to release the buffer for storage of another packet because the global RED packed dropper has determined that the packet is not to be transmitted.

When the drop indicator is a logic low ("0"), the state machine 44 causes the egress packet descriptor to be stored in the queue in the memory unit 367. The drop counter value stored in the drop counter register 483 is not incremented and a release buffer signal is not sent to the buffer storing the packet associated with the egress packet descriptor because the global RED packet dropper has determined that the packet is to be transmitted. The egress packet descriptor is then communicated from the queue in memory unit 367 to scheduler 366. Scheduler 366 then communicates the egress packet descriptor to DMA 363 which causes the packet associated with the egress packet descriptor to be transmitted.

Setting of the global RED packet dropper can be programmed by a processor across a command bus interface. For example, the LFSR seeds used by the random value generator 488 can be modified by writing new LFSR seeds into LFSR seeds register 481 across the control bus. The drop count value stored in the drop counter register can be cleared or read across the control bus by another processor on the control bus. Likewise, the comparator thresholds stored in the drop probability register 482 can be modified by writing new global drop indicators into the drop probability register across the control bus. This programmability allows for adjustable operation of drop probabilities during operation.

Figure 41:
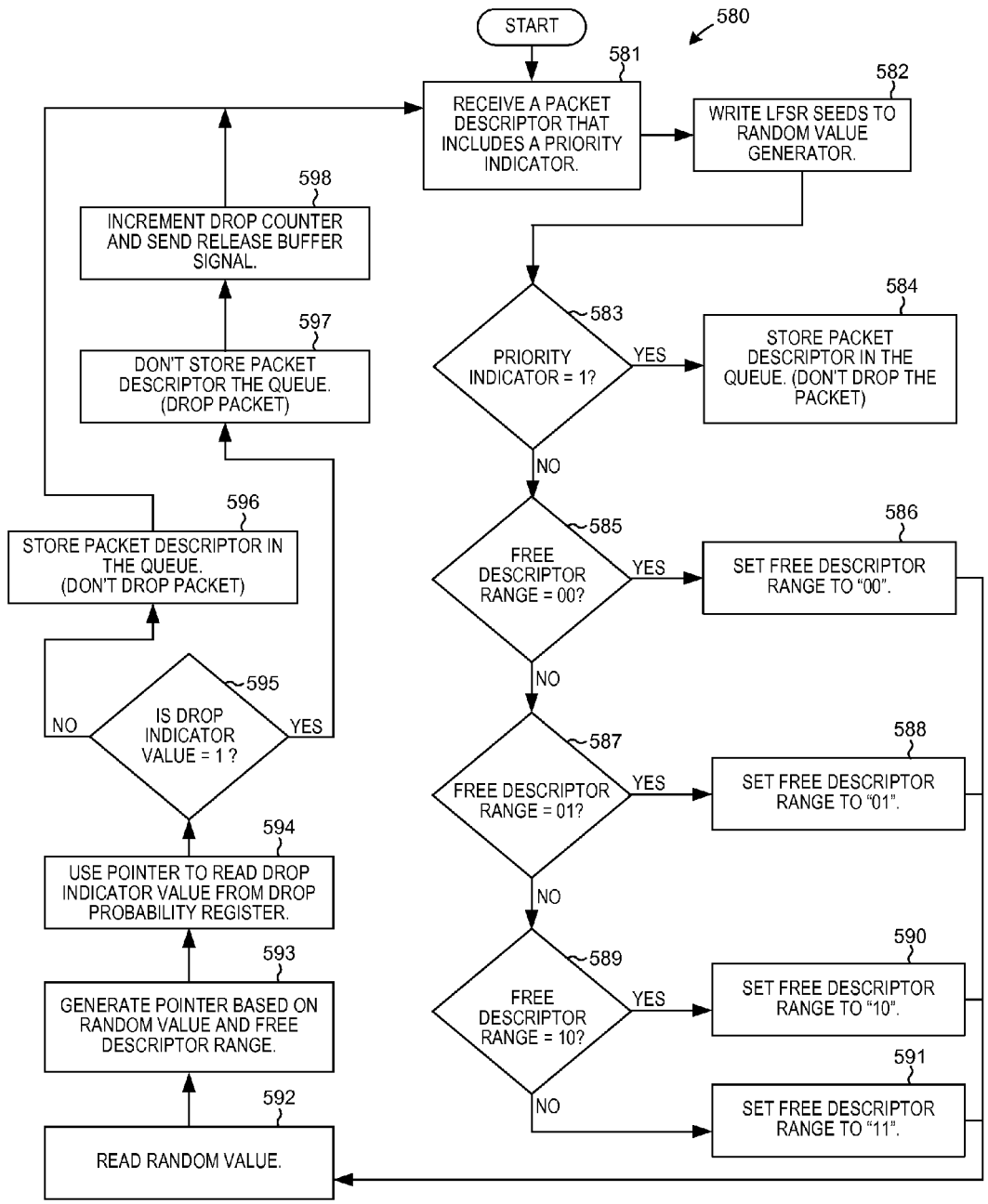
FIG. 41 is a diagram illustrating the operation 580 of the second example of the global RED packet dropper 450.

FIG. 41 illustrates the operation 580 of the second embodiment of the global RED packet dropper. In step 581 and egress packet descriptor is received. The egress packet descriptor includes a priority indicator. In step 582 LFSR seeds are written to the random value generator. In step 583 it is determined that the priority indicator is a logic high value (1). If the priority indicator is a logic high value then the egress packet descriptor is stored in the queue associated with the egress packet descriptor and the packet is not dropped (step 584). If it is determined that the priority indicator is a logic low value (0), then it is determined if the free descriptor count is within a first range (00) (step 585). If the free descriptor count is within the first free descriptor range then the free descriptor range is set to 00 (step 586). If the free descriptor count is not within the first free descriptor range then it is determined if the free descriptor count is within a second free descriptor range (step 587). If the free descriptor count is within the second free descriptor range then the free descriptor range is set to 01 (step 588). If the free descriptor count is not within the second free descriptor range then it is determined if the free descriptor count is within a third free descriptor range (step 589). If the free descriptor is within the third free descriptor range the free descriptor range is set to 10 (step 590). If the free descriptor count is not within the third free descriptor range of free descriptor range is set to 11 (step 591). In step 592 the random value is read from the random value generator 488. In step 590 3 A pointer is generated based on the random value and the free descriptor range. The pointer is used to read a global drop indicator value from the drop probability register (594). In step 595 it is determined if the drop indicator is a logic high value (1). If the drop indicator is a logic high value the egress packet descriptor is not stored in the queue associated with the egress packet descriptor (step 597). Then the drop counter is incremented and a release buffer signal is sent to the memory location where the packet associated with the egress packet descriptor is stored (step 598). Alternatively, if the drop indicator is a logic low value, then the egress packet descriptor is stored in the queue associated with the egress packet descriptor so that the packet associated with the egress packet descriptor will be sent and the packet is not dropped.

Figure 42:
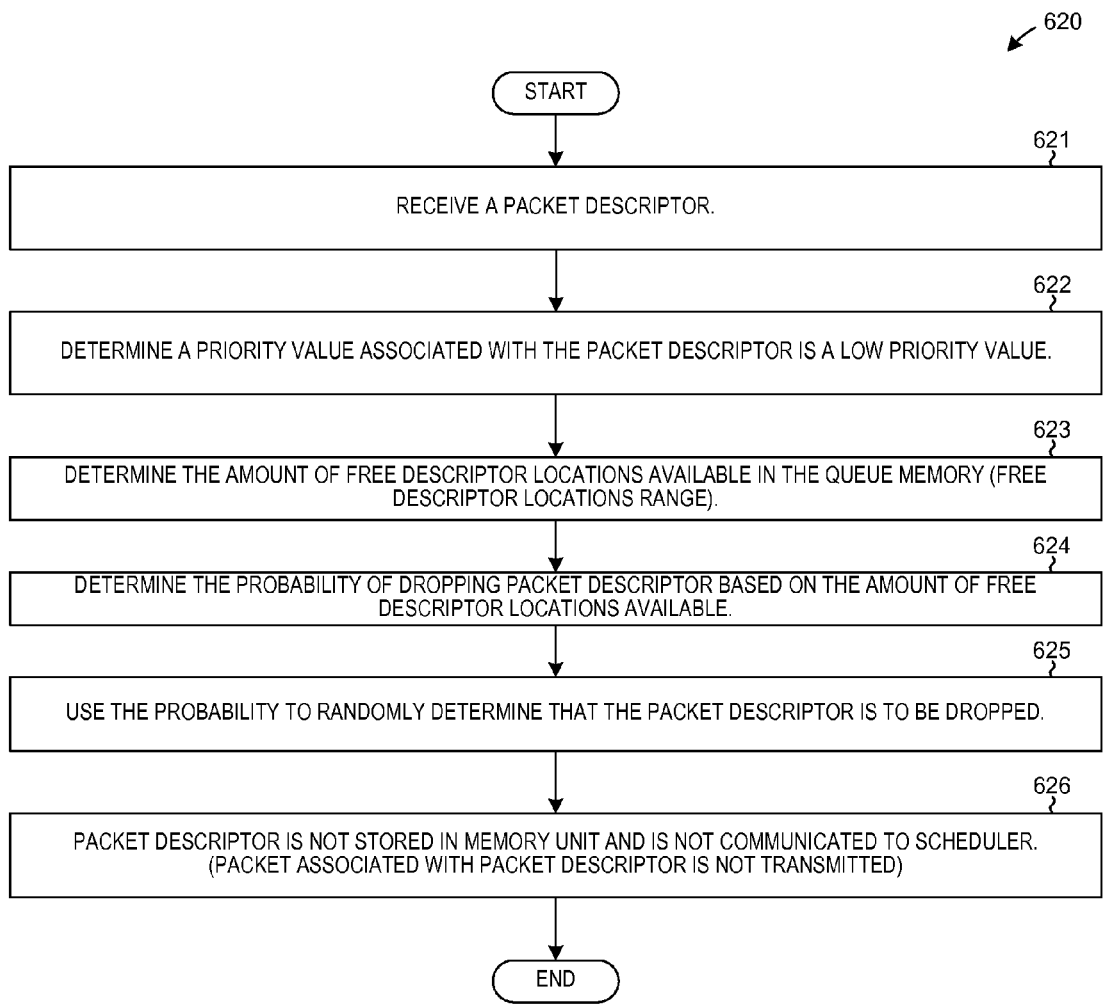
FIG. 42 is a flowchart 620 illustrating a first method of operation of a global RED packet dropper.

FIG. 42 is a flowchart 620 illustrating the operation of the second embodiment of a global RED packet dropper 450. In step 621, and egress packet descriptor is received. In step 622 the priority value associated with the egress packet descriptor is determined to be a low priority value. In step 623 the amount of free descriptor locations available in the queue memory is determined. The amount of free descriptor locations available the queue memory isn't indicator of the amount of free memory space available in the queue. In step 624 the probability of dropping the packet associated with the egress packet descriptor is determined based on the amount of free descriptor locations that are available. In step 625 the probability determined in step 624 is used to randomly determine that the packet descriptor is to be dropped. In step 626 the egress packet descriptor is not stored in the queue within the memory unit and therefore is not communicated to scheduler, thereby dropping the packet associated with the egress packet descriptor.

Figure 43:
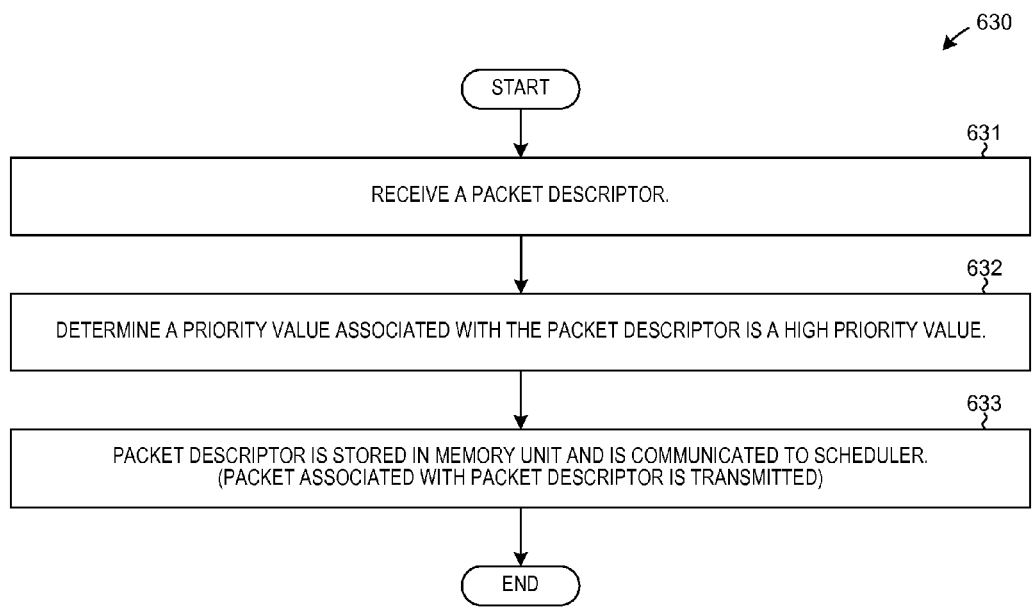
FIG. 43 is a flowchart 630 illustrating a second method of operation of a global RED packet dropper.

FIG. 43 is a flowchart 630 that illustrates the operation of the second embodiment of a global RED packet dropper 450. In step 631 and egress packet descriptor is received. In step 632 is a parity value associated with the egress packet descriptor is determined. The egress packet descriptor is determined to w have a high priority value. In step 633 the egress packet descriptors stored in the queue within the memory unit and is therefore communicated to scheduler, thereby causing the packet associated with the egress packet descriptor to be transmitted (i.e. the packet associated with the egress packet descriptor is not dropped).

Figure 44:
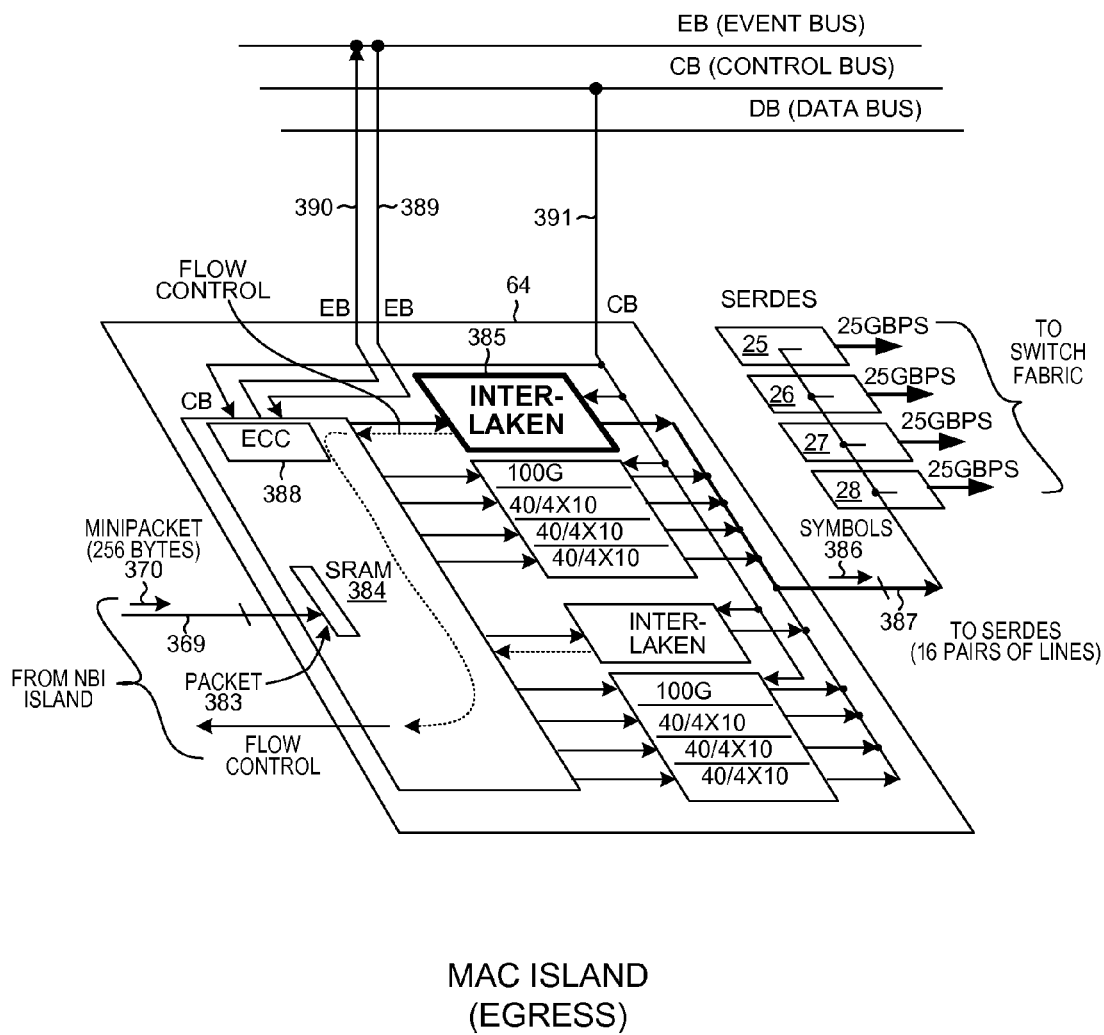
FIG. 44 is a diagram of egress MAC island 64 and SerDes blocks 25-28.

FIG. 44 is a diagram of egress MAC island 64. A packet 383 for transmission are received from egress NBI island 63 in the form of minipackets 370 via dedicated connections 369. The packets are buffered in SRAM 384. In the operational example, the packets to be output from the egress MAC island via are converted into symbols by Interlaken block 385. The resulting symbols 386 pass via dedicated connections 387 to the four SerDes I/O blocks 25-28. As described above in connection with FIG. 1, the four SerDes I/O blocks are coupled by SerDes connections 29 to switch fabric 9 of the MPLS router 1. ECC circuitry 388 of SRAM 384 is made a part of a local event ring via EB connections 389 and 390. Sub-circuits of MAC island are configurable. Configuration information for these sub-circuits is received from the control bus tree via connections 391.

Figure 45:
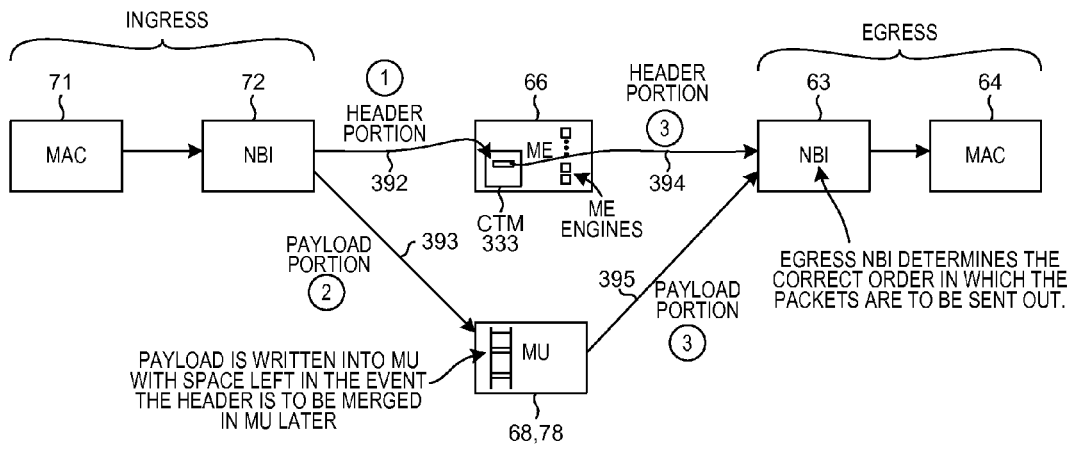
FIG. 45 is a diagram that illustrates a packet flow in the operational example when local memory resources in the CTM 333 of the ME island 66 are determined not to be scarce (for example, the processing resource is determined not to be below a predetermined threshold).

FIG. 45 is a diagram that illustrates a packet flow in the operational example when local memory resources in the CTM 333 of the ME island 66 are determined not to be scarce. An incoming packet passes through the ingress MAC island 71 and the ingress NBI island 72 as described above.

Arrow 392 indicates that the header portion is then transferred (Step 1) across the configurable mesh data bus into CTM 333 of ME island 66, whereas arrow 393 indicates that the payload portion of the packet is transferred (Step 2) across the configurable mesh data bus into the MU island 68,78 without being stored in the ME island. The payload portion of each packet is stored in the MU island such that spare memory space is left at the beginning of where the payload is stored. That spare memory space is adequate to accommodate the header portion of the packet without overwriting other packet payloads. In the case of FIG. 35, however, the header portion is never written into the MU island. Microengines of the ME island and hardware engines of the MU island analyze and process the packet. Arrow 394 indicates that the header portion is then transferred (Step 3) from the ME island 66 and to the egress NBI island 63. Arrow 395 indicates that the payload portion is transferred (Step 3) from the MU island 68, 78 to the egress NBI island 63. The same step number is used because these transfers may occur simultaneously. The header portion and the payload portion are combined in the NBI island 63 and then pass through the egress MAC island 64 and the four SerDes I/O blocks and out of the IB-NFP integrated circuit.

Figure 46:
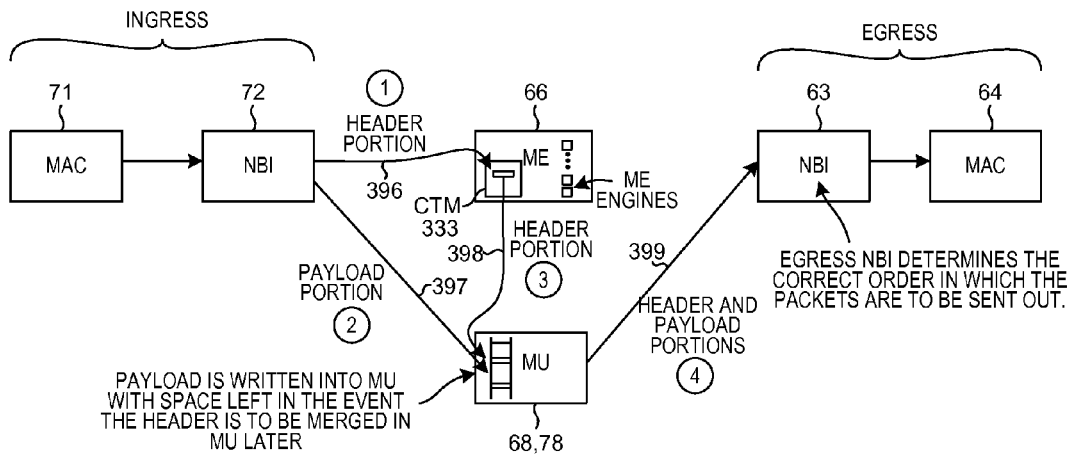
FIG. 46 is a diagram that illustrates a packet flow in the operational example when local memory resources in the CTM 333 of the ME island 66 are determined to be scarce (for example, the processing resource is determined to be below a predetermined threshold).

FIG. 46 is a diagram that illustrates a packet flow in the operational example when local memory resources in the CTM 333 of the ME island 66 are determined to be scarce. An incoming packet passes through the ingress MAC island 71 and the ingress NBI island 72 as described above. As indicated by arrow 396, the header portion is then transferred (Step 1) across the configurable mesh data bus into CTM 333 of ME island 66. Arrow 396 indicates that the payload portion of the packet is transferred (Step 2) across the configurable mesh data bus into the MU island 68, 78 without being stored in the ME island. As in the case described above in connection with FIG. 36, the payload portion of each packet is stored in the MU such that spare memory space exists at the beginning of where the payload is stored. The spare memory space is adequate to accommodate the header portion without overwriting other packet payloads. Based on how long it will take before the packet will be transmitted from the IB-NFP, the egress NBI island 63 determines that the header portion shall be moved from the ME island and to MU island in order to free up resources in the CTM 333 of the ME island. As indicated by arrow 398, the header portion is transferred (Step 3) from the ME island and is stored into the ME island into the spare memory space at the beginning of its associated payload portion. Microengines of the ME island and hardware engines of the MU island analyze and process the packet. The packet may be analyzed before the transfer 398, or after the transfer 398, or both. When the scheduler of the egress NBI island determines that the packet is to be transferred for transmission from the IB-NFP integrated circuit, then the header portion and the payload portion are DMA transferred (Step 4) together directly from the MU island and across the configurable mesh data bus and to the egress NBI island. Arrow 399 indicates this transfer of the packet header and the packet payload. The packet then passes across dedicated connections from the egress NBI island 63 to the egress MAC island 64, and through the four SerDes blocks, and out of the IB-NFP integrated circuit.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:
   (a) receiving a packet descriptor that includes a queue number and a-a priority indicator, wherein the queue number indicates a queue stored within a first memory unit located on a first island in an Island-Based Network Flow Processor (IB-NFP), wherein the packet descriptor is associated with packet information stored in a second memory unit, and wherein packet information includes at least a portion of a packet;
   (b) determining an amount of free memory in the first memory unit;
   (c) determining if the amount of free memory in the first memory unit is within a first range;
   (d) determining a priority level associated with the packet;
   (e) when the amount of free memory in the first memory unit is within the first range and the priority level associated with the packet is a first level, causing the packet to be written from the second memory unit to a third memory unit; and
   (f) when the amount of free memory in the first memory unit is not within the first range or the priority level associated with the packet is a second level, not causing the packet to be written to the third memory unit from the second memory unit, wherein the second and third memory units are not located on the first island in the IB-NFP, and wherein the packet descriptor is not stored in the first, second or third memory unit.

2. The method of claim 1, wherein the second memory unit is located on a second island in the IB-NFP, and wherein the third memory unit is external from the IB-NFP.

3. The method of claim 1, wherein the second memory unit is external from the IB-NFP, and wherein the third memory unit is located on a second island in the IB-NFP.

4. The method of claim 1, wherein (e) and (f) are performed at least in part by a packet mover circuit, wherein the packet mover circuit is located in a scheduler circuit, wherein the packet information is a packet, wherein the packet descriptor is generated by a packet classifier circuit, wherein the priority level associated with the packet information is generated by the packet classifier circuit, wherein multiple queues are stored in the first memory unit, wherein the first range is programmable, and wherein the amount of free memory includes all free memory in all queues stored in the first memory unit.

5. The method of claim 1, wherein the amount of memory in the first memory unit is fixed, and wherein the first memory unit is Cluster Target Memory (CTM), and wherein the packet mover circuit is located in the first memory unit.

6. The method of claim 1, wherein the determining of (b), further comprises:
   (b1) reading a free descriptor count from the first memory unit, wherein a free descriptor counter located in the memory unit and generates the free descriptor count.

7. The method of claim 6, wherein the free descriptor counter decrements the free descriptor count when a packet descriptor is stored in a queue in the first memory unit, and wherein the free descriptor counter increments the free descriptor count when a packet descriptor is removed from a queue in the first memory unit.

8. The method of claim 1, wherein the determining of (c) further comprises:
   (c1) comparing the free descriptor count value with a free descriptor threshold value, wherein the first range includes all free descriptor count values greater than the free descriptor threshold value, and wherein the second range includes all free descriptor count values less than the free descriptor threshold value.

9. The method of claim 1, wherein the determining of (d) further comprises:
   (d1) parsing the priority indictor included in the packet descriptor; and
   (d2) determining if the priority indicator is set to a logic high state.

10. The method of claim 1, further comprising:
    (e1) writing a new Direct Memory Access (DMA) descriptor entry to a DMA descriptor list when the packet information is written to the third memory unit from the first memory unit, wherein the DMA descriptor entry indicates where the packet information associated with the packet descriptor is stored, and wherein the DMA descriptor list is stored in the first memory unit.

11. The method of claim 1, wherein the packet descriptor is generated by a packet classifier circuit, and wherein the packet classifier circuit causes the packet information to be stored in the second memory unit.

12. A method, comprising:
    (a) receiving a packet descriptor that includes a queue number, wherein the queue number indicates a queue stored within a first memory unit located on a first island in an Island-Based Network Flow Processor (IB-NFP), wherein the packet descriptor is not stored in the second memory unit, and wherein the packet descriptor is associated with a packet stored in a second memory unit;
    (b) determining an amount of free memory in the first memory unit;
    (c) determining if the amount of free memory in the first memory unit is within a first range;
    (d) determining a priority level associated with the packet;
    (e) when the amount of free memory in the first memory unit is within the first range and the priority level associated with the packet is a first level, causing the packet to be written from the second memory unit to a third memory unit; and
    (f) when the amount of free memory in the first memory unit is not within the first range or the priority level associated with the packet is a second level, not causing the packet to be written to the third memory unit from the second memory unit, and wherein the second and third memory units are not located on the first island in the IB-NFP.

13. The method of claim 12, wherein the determining of (d) further comprises:
    (d1) reading a priority indicator from a priority indicator register, wherein the priority indicator register is programmable.

14. The method of claim 13, wherein the reading of the priority indicator, further comprises:
    generating an address that is a function of the queue number; and
    reading the address location in the priority indicator register, wherein the address location in the priority indicator register is programmed with the priority indicator for all packet descriptors associated with the queue number.

15. The method of claim 13, wherein the priority indicator register is programmed across a command bus, wherein the priority indicator is a single bit value, wherein a logic high bit indicates the first priority level, and wherein a logic low bit indicates the second priority level.

16. The method of claim 12, wherein the determining of (b), further comprises:
(b1) reading a free descriptor count from the first memory unit, wherein a free descriptor counter located in the memory unit and generates the free descriptor count.

17. The method of claim 16, wherein the free descriptor counter decrements the free descriptor count when a packet descriptor is stored in a queue in the first memory unit, and wherein the free descriptor counter increments the free descriptor count when a packet descriptor is removed from a queue in the first memory unit.

18. The method of claim 12, wherein the determining of (c) further comprises:
(c1) comparing the free descriptor count value with a free descriptor threshold value, wherein the first range includes all free descriptor count values greater than the free descriptor threshold value, and wherein the second range includes all free descriptor count values less than the free descriptor threshold value.

19. The method of claim 12, further comprising:
(e1) writing a new Direct Memory Access (DMA) descriptor entry to a DMA descriptor list when the packet is written to the third memory unit from the first memory unit, wherein the DMA descriptor entry indicates where the packet associated with the packet descriptor is stored, and wherein the DMA descriptor list is stored in the first memory unit.

20. The method of claim 12, wherein the second memory unit is located on a second island in the IB-NFP, and wherein the third memory unit is external from the IB-NFP.

21. The method of claim 12, wherein the second memory unit is external from the IB-NFP, and wherein the third memory unit is located on a second island in the IB-NFP.

* * * * *